INVENTORS.
ROY T. ADOLPHSON
JOHN DOUGLASS, JR.
BY HYMAN ROBERT SHAMPAINE

ATTORNEY

INVENTORS.
ROY T. ADOLPHSON
JOHN DOUGLASS, JR.
HYMAN ROBERT SHAMPAINE

ATTORNEY

INVENTORS.
ROY T. ADOLPHSON
JOHN DOUGLASS, JR.
HYMAN ROBERT SHAMPAINE
BY
ATTORNEY

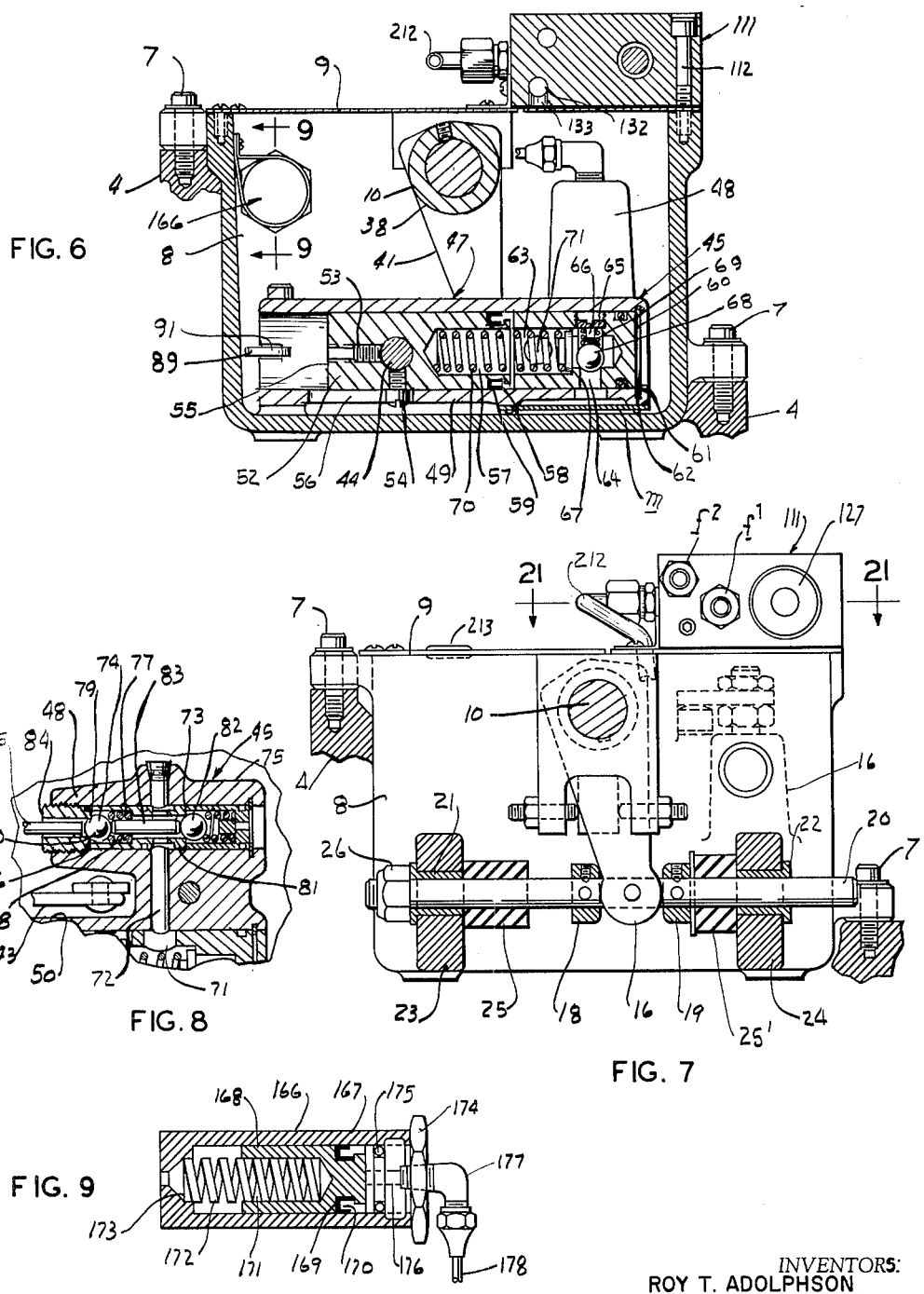

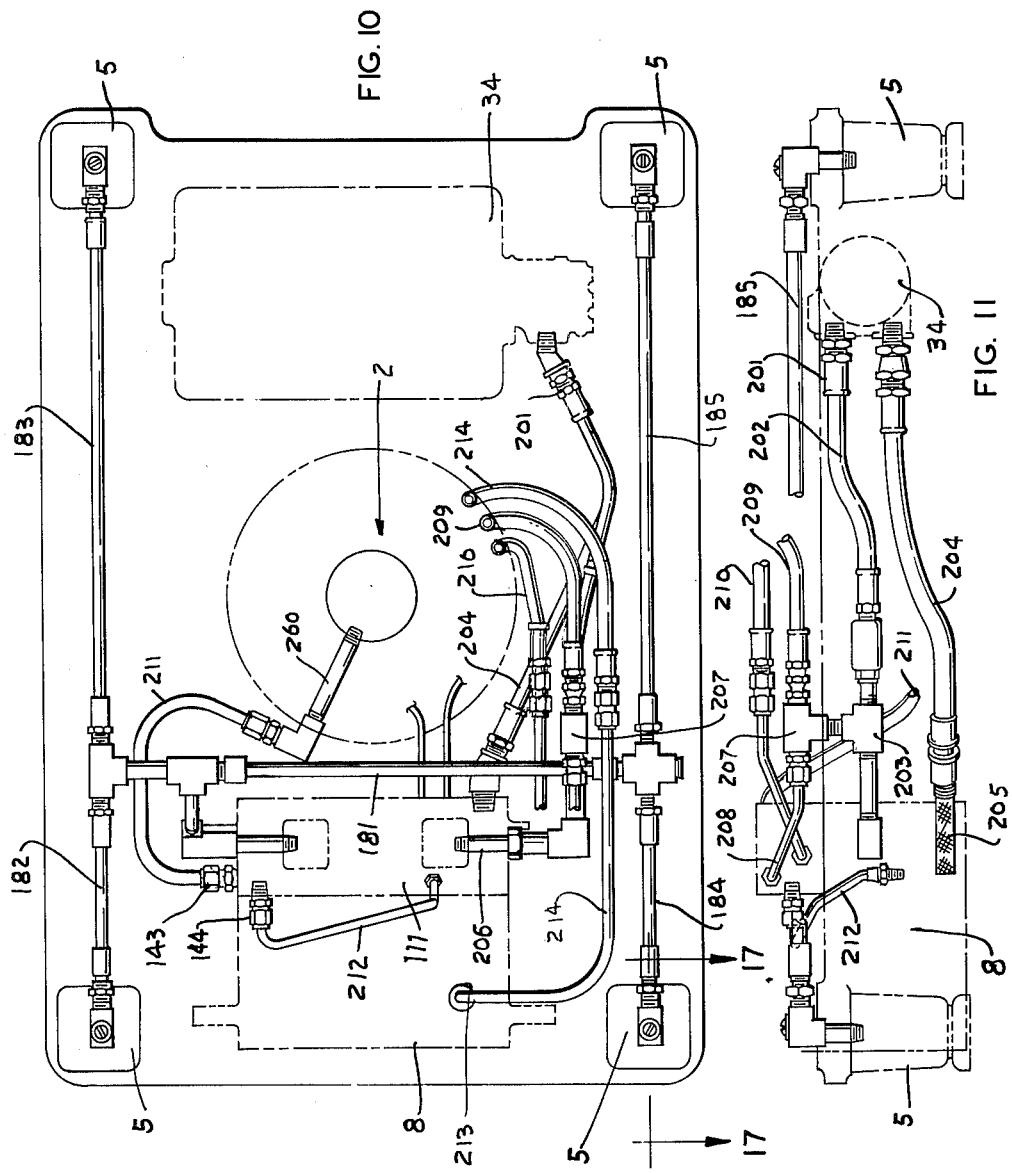

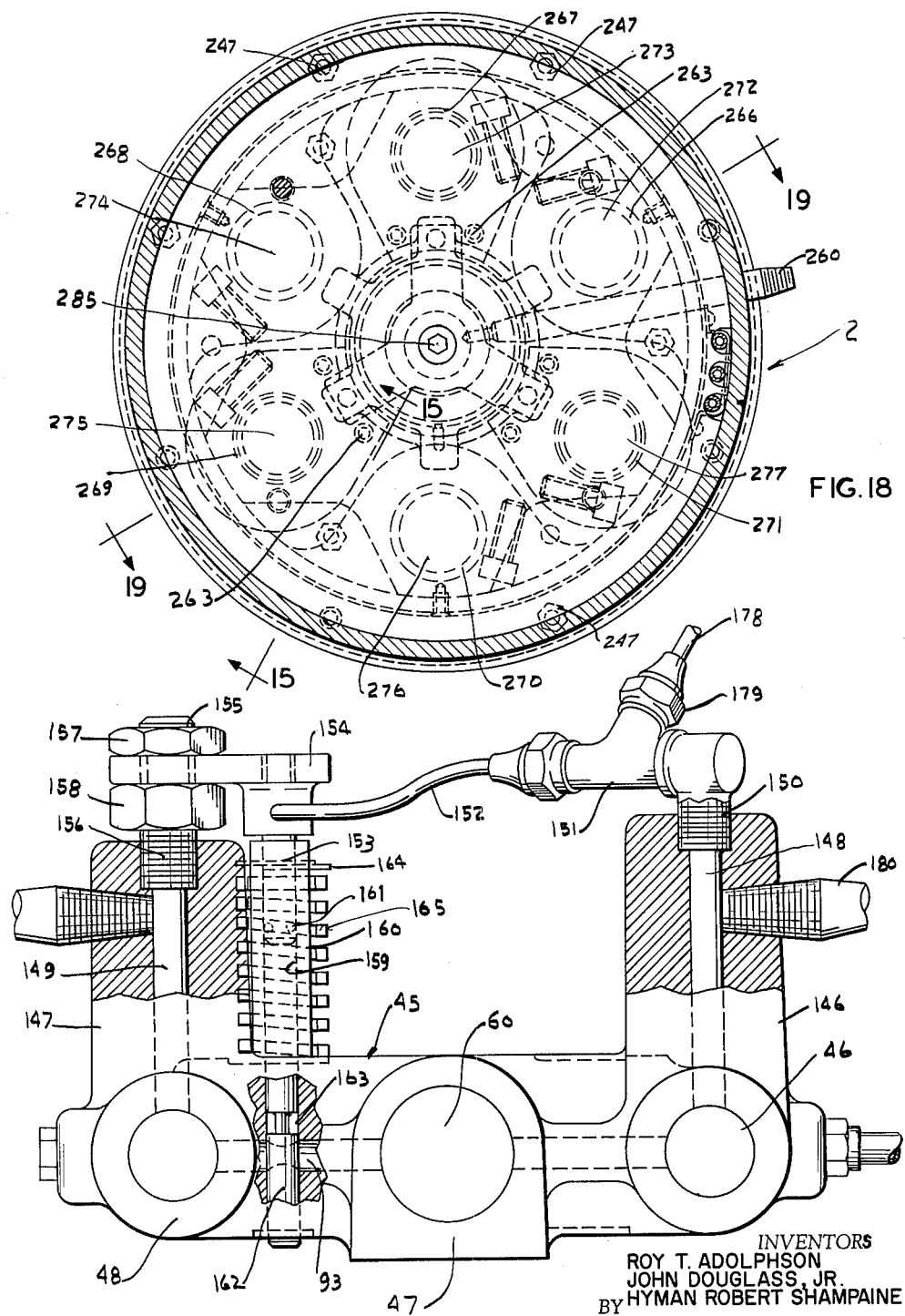

March 22, 1966 R. T. ADOLPHSON ETAL 3,241,828
SURGICAL OPERATING TABLES HAVING POWER-DRIVEN
ARTICULATED ELEMENTS
Filed Aug. 21, 1961 23 Sheets-Sheet 8
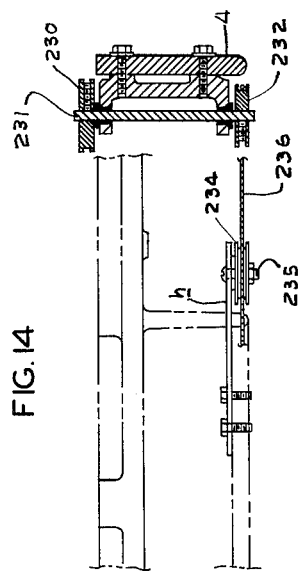
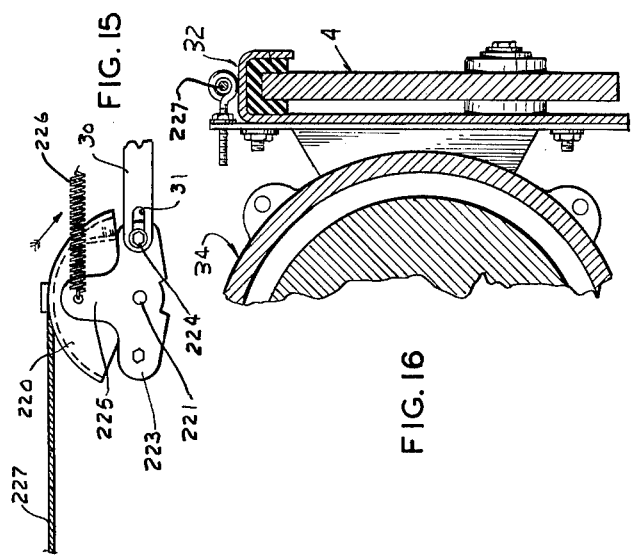
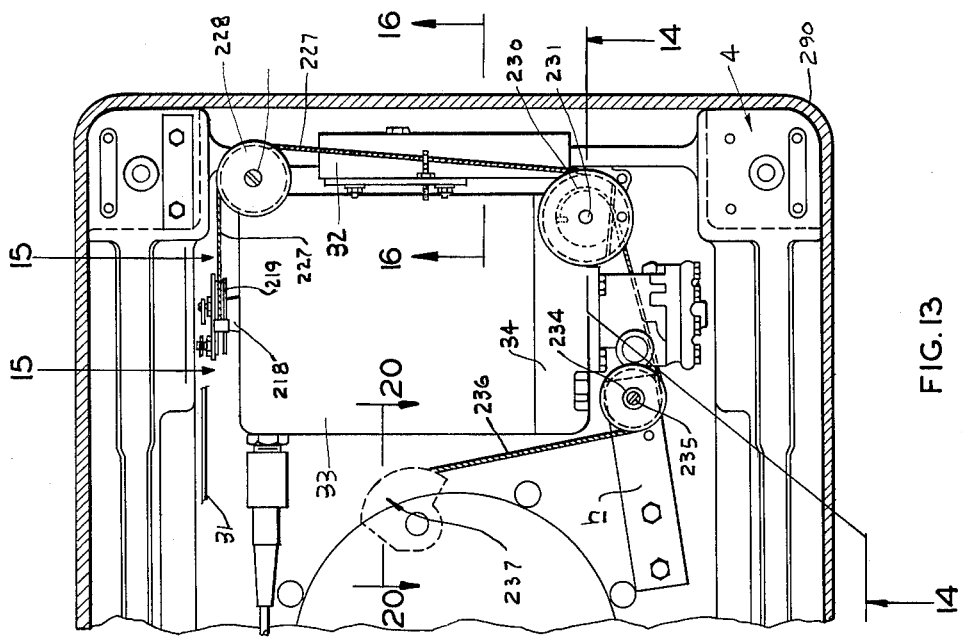
Inventors:
ROY T. ADOLPHSON
JOHN DOUGLASS, JR.
HYMAN ROBERT SHAMPAINE
By Alfred W. Petchaft
Attorney

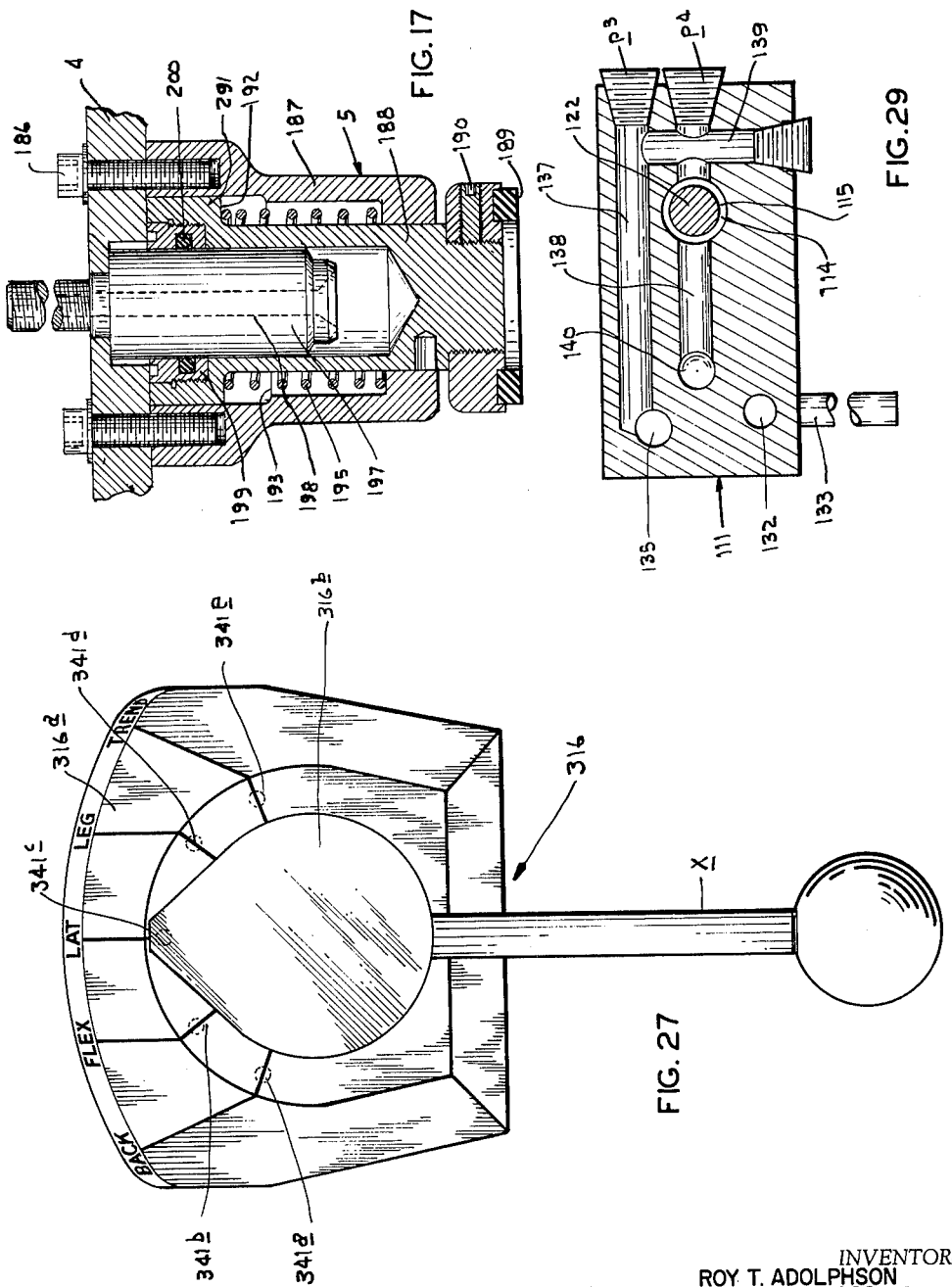

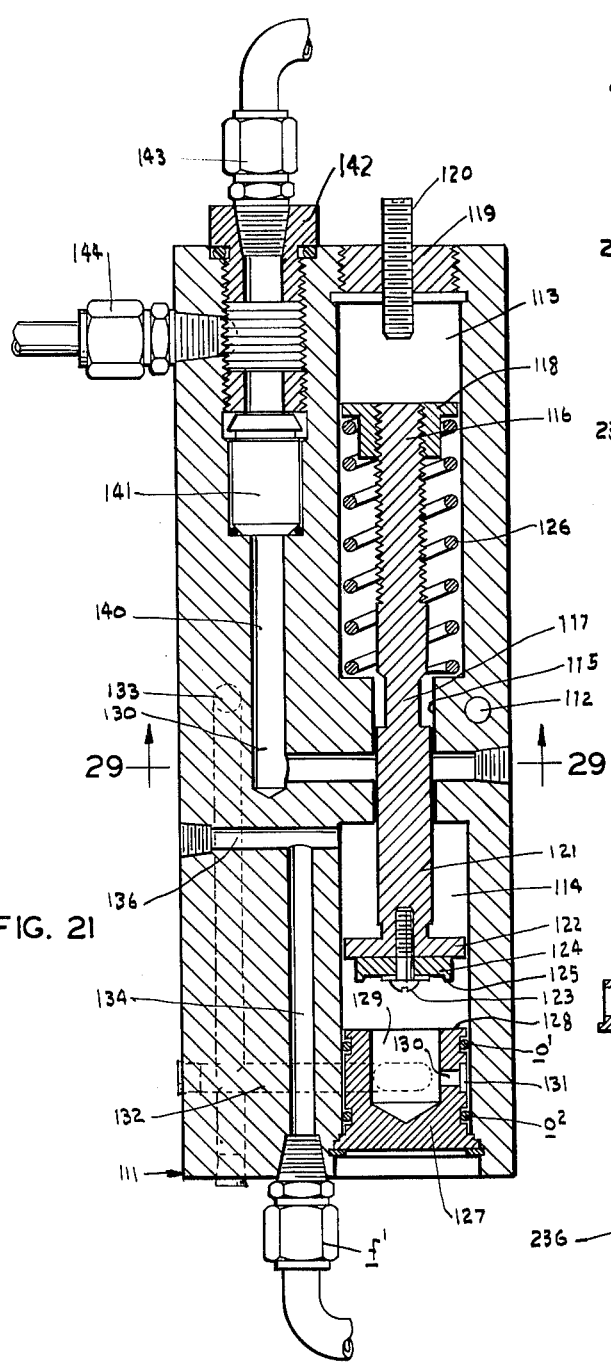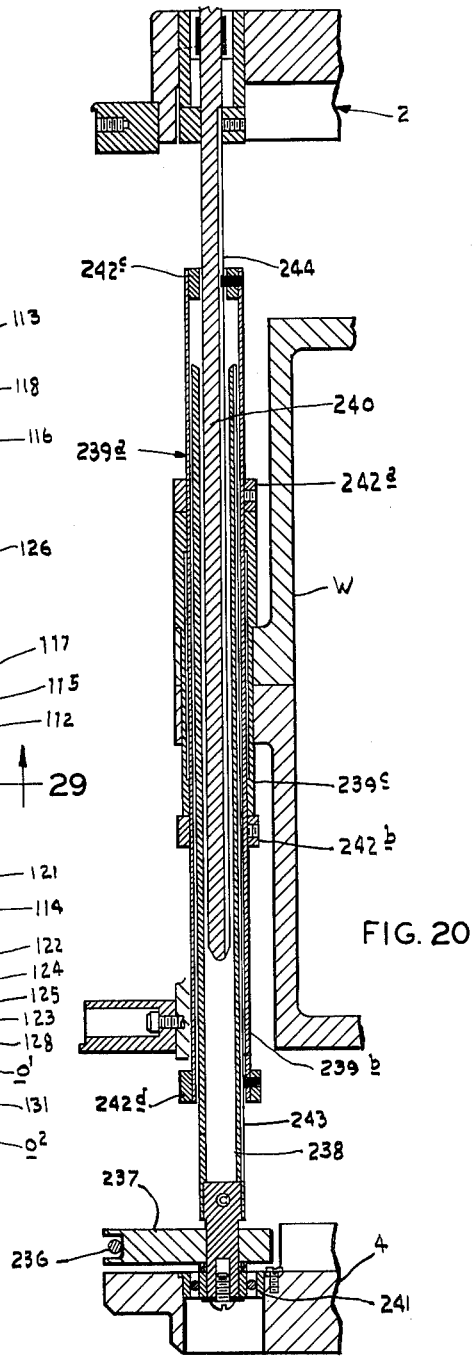

March 22, 1966 R. T. ADOLPHSON ETAL 3,241,828
SURGICAL OPERATING TABLES HAVING POWER-DRIVEN
ARTICULATED ELEMENTS
Filed Aug. 21, 1961 23 Sheets-Sheet 12

*INVENTORS:*
ROY T. ADOLPHSON
JOHN DOUGLASS, JR.
*BY* HYMAN ROBERT SHAMPAINE

ATTORNEY

March 22, 1966 R. T. ADOLPHSON ETAL 3,241,828
SURGICAL OPERATING TABLES HAVING POWER-DRIVEN
ARTICULATED ELEMENTS
Filed Aug. 21, 1961 23 Sheets-Sheet 14

INVENTORS:
ROY T. ADOLPHSON
JOHN DOUGLASS, JR.
HYMAN ROBERT SHAMPAIN
BY
ATTORNEY

March 22, 1966 R. T. ADOLPHSON ETAL 3,241,828
SURGICAL OPERATING TABLES HAVING POWER-DRIVEN
ARTICULATED ELEMENTS
Filed Aug. 21, 1961 23 Sheets-Sheet 15

INVENTORS:
ROY T. ADOLPHSON
JOHN DOUGLASS, JR.
BY HYMAN ROBERT SHAMPAINE

ATTORNEY

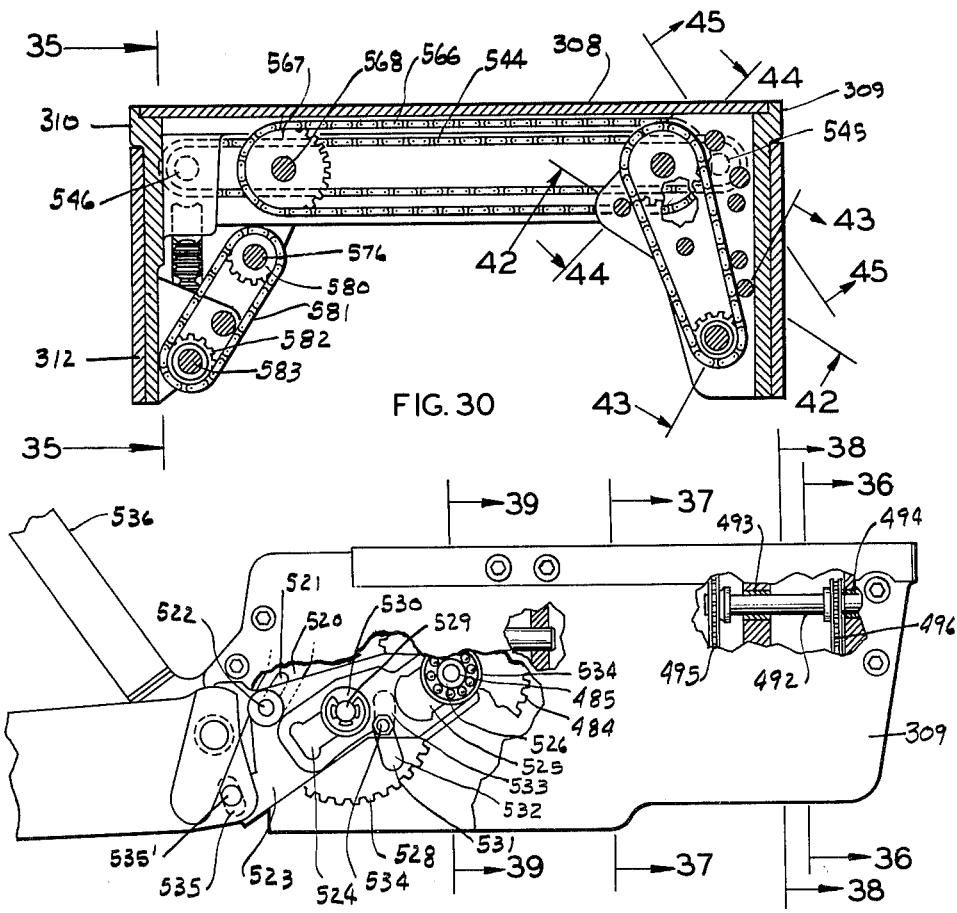
FIG. 30
FIG. 31
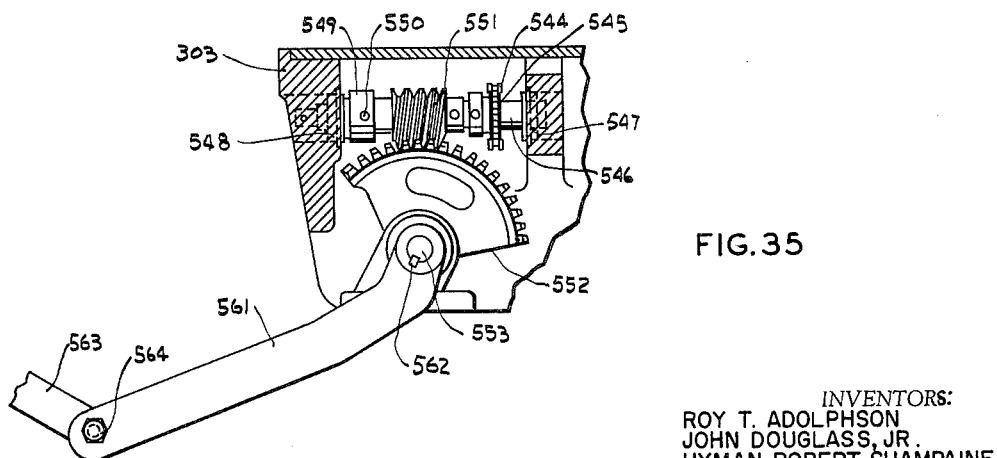
FIG. 35
INVENTORS:
ROY T. ADOLPHSON
JOHN DOUGLASS, JR.
BY HYMAN ROBERT SHAMPAINE
ATTORNEY March 22, 1966  R. T. ADOLPHSON ETAL  3,241,828
SURGICAL OPERATING TABLES HAVING POWER-DRIVEN
ARTICULATED ELEMENTS
Filed Aug. 21, 1961  23 Sheets-Sheet 19

INVENTORS:
ROY T. ADOLPHSON
JOHN DOUGLASS, JR.
BY HYMAN ROBERT SHAMPAINE

ATTORNEY

March 22, 1966 R. T. ADOLPHSON ETAL 3,241,828
SURGICAL OPERATING TABLES HAVING POWER-DRIVEN
ARTICULATED ELEMENTS
Filed Aug. 21, 1961 23 Sheets-Sheet 20

INVENTORS:
ROY T. ADOLPHSON
JOHN DOUGLASS, JR.
BY HYMAN ROBERT SHAMPAINE

ATTORNEY

March 22, 1966   R. T. ADOLPHSON ETAL   3,241,828
SURGICAL OPERATING TABLES HAVING POWER-DRIVEN
ARTICULATED ELEMENTS
Filed Aug. 21, 1961   23 Sheets-Sheet 22
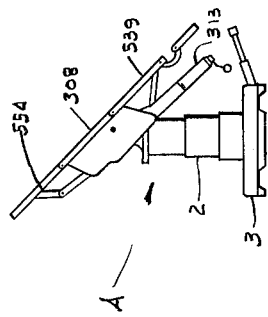
FIG. 57
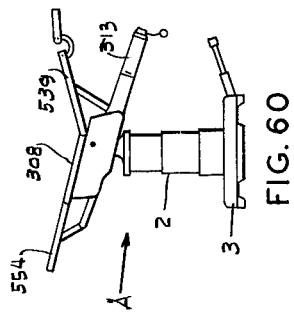
FIG. 60
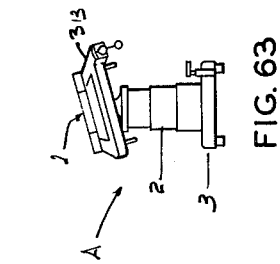
FIG. 63
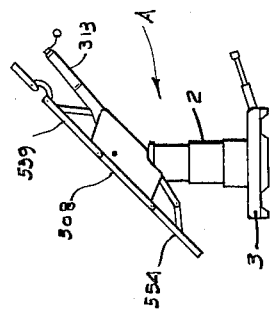
FIG. 56
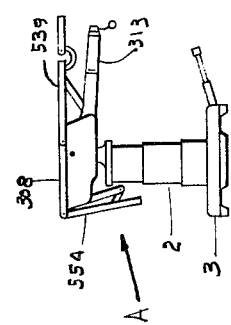
FIG. 59
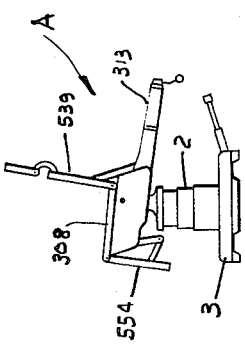
FIG. 62
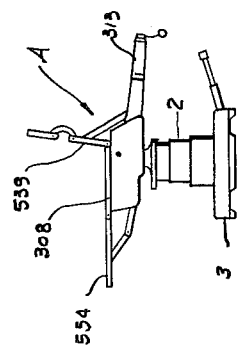
FIG. 55
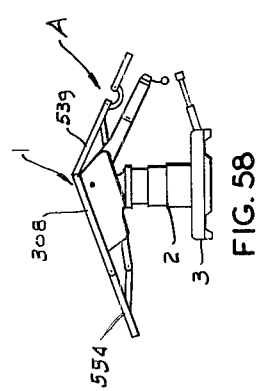
FIG. 58
FIG. 61
INVENTORS:
ROY T. ADOLPHSON
JOHN DOUGLASS, JR.
BY HYMAN ROBERT SHAMPAINE
*Alfred W. Petchaft*
ATTORNEY March 22, 1966  R. T. ADOLPHSON ETAL  3,241,828
SURGICAL OPERATING TABLES HAVING POWER-DRIVEN
ARTICULATED ELEMENTS
Filed Aug. 21, 1961   23 Sheets-Sheet 23

INVENTORS:
ROY T. ADOLPHSON
JOHN DOUGLASS, JR.
BY HYMAN ROBERT SHAMPAINE

Alfred W. Petchaft
ATTORNEY

United States Patent Office 3,241,828
Patented Mar. 22, 1966

3,241,828
SURGICAL OPERATING TABLES HAVING POWER-DRIVEN ARTICULATED ELEMENTS
Roy T. Adolphson, 309 Honeysuckle Lane, Webster Groves, Mo.; John Douglass, Jr., 1920 S. Jefferson, St. Louis, Mo.; and Hyman Robert Shampaine, 00 Dromara Road, Ladue, Mo.
Filed Aug. 21, 1961, Ser. No. 132,814
19 Claims. (Cl. 269—325)

This invention relates in general to surgical apparatus and, more particularly, to new and useful improvements in operating tables of the type ordinarily used in performing major surgery.

The primary object, therefore, of the present invention is to provide a surgical operating table having an articulated top and power-driven means for tilting the top laterally and longitudinally as a unit and also swinging the various sections of the top in relation to each other so that the top may assume a variety of positions required by different surgical operations.

It is also an object of the present invention to provide an operating table of the type stated that includes an elevating mechanism and a plurality of floor-contacting jacks, all of which can be optionally operated by a foot pedal in the base of the table.

It is another object of the present invention to provide an operating table of the type stated in which all of the desired surgical positions of the articulated top can be attained by the manipulation of a single control-handle.

It is a further object of the present invention to provide an operating table of the type stated in which the control-handle is located outside of the sterile field and is conveniently accessible at the head-end of the table.

It is still another object of the present invention to provide an operating table of the type stated providing a motorized hydraulic power source for attaining all of the desired surgical positions.

With the above and other objects in view, our invention resides in the novel features of form, construction, arrangement, and combination of parts presently described and pointed out in the claims.

Figure 1:
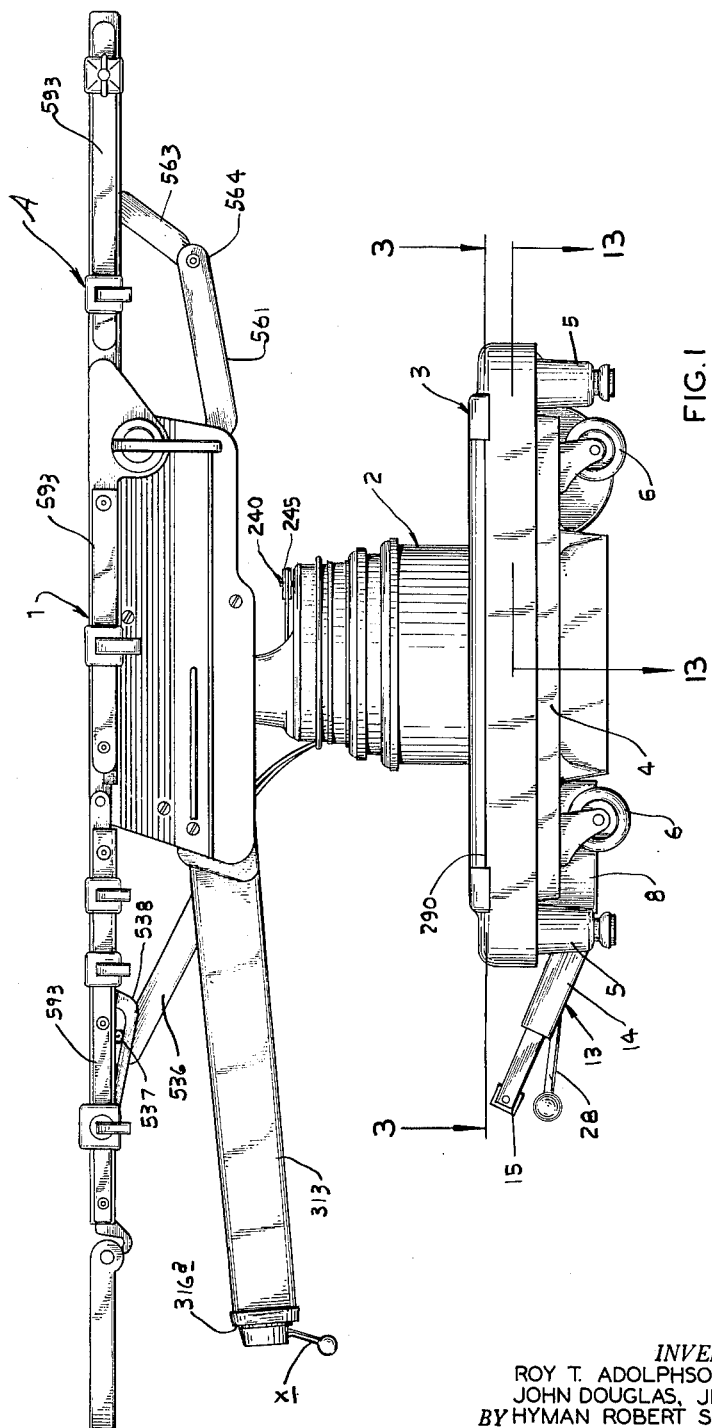
FIG. 1 is an elevational view of the right side of an operating table constructed in accordance with and embodying the present invention.
Figure 2:
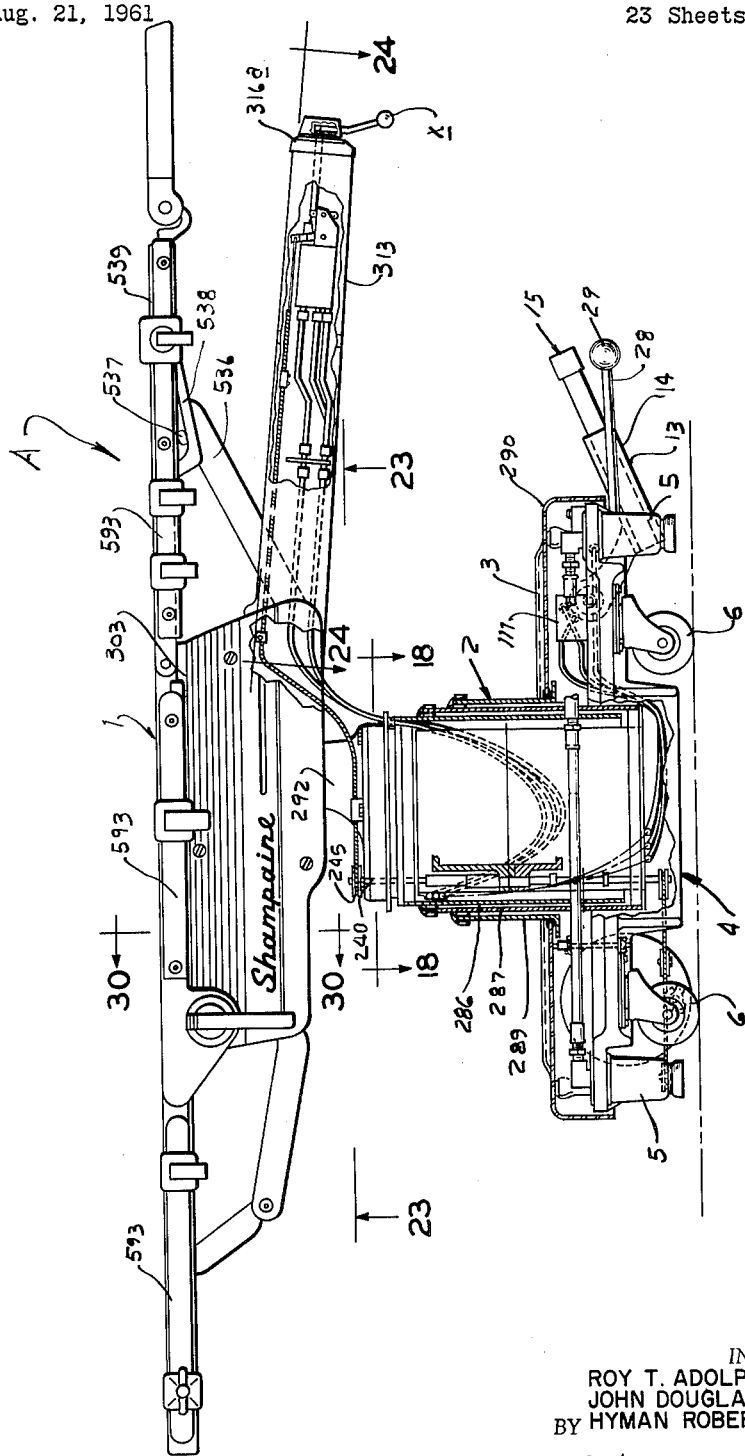
FIG. 2 is an elevational view, partly broken away and in section, of the left side of an operating table embodying the present invention.
Figure 5:
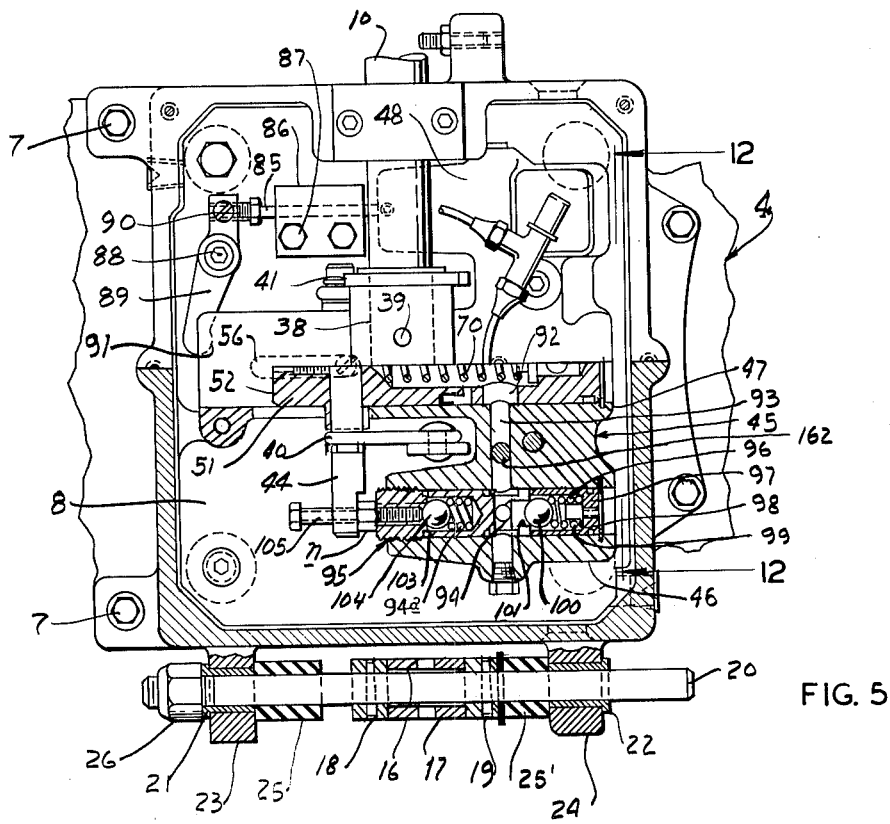
FIG. 5 is a fragmentary sectional view taken along line 5—5 of FIG. 4.
Figure 4:
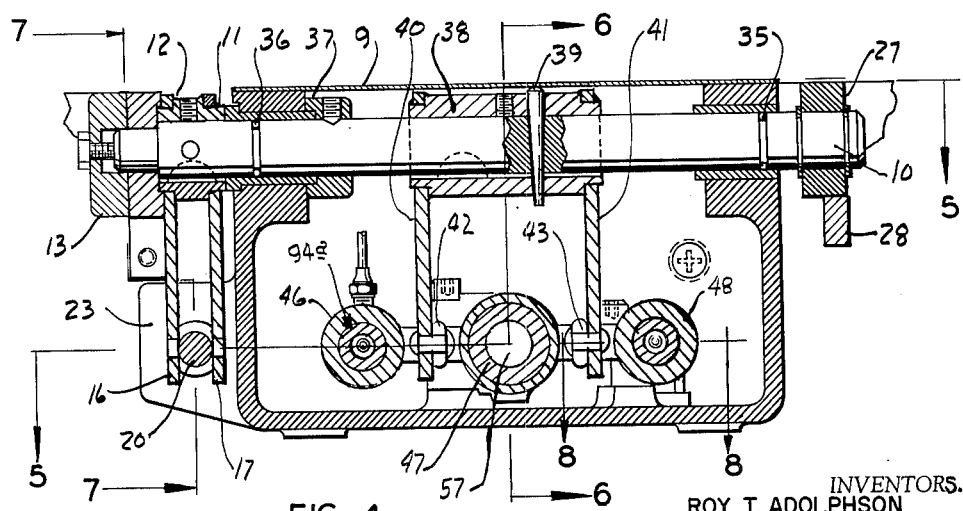
FIG. 4 is a fragmentary sectional view taken along line 4—4 of FIG. 3.
Figure 19:
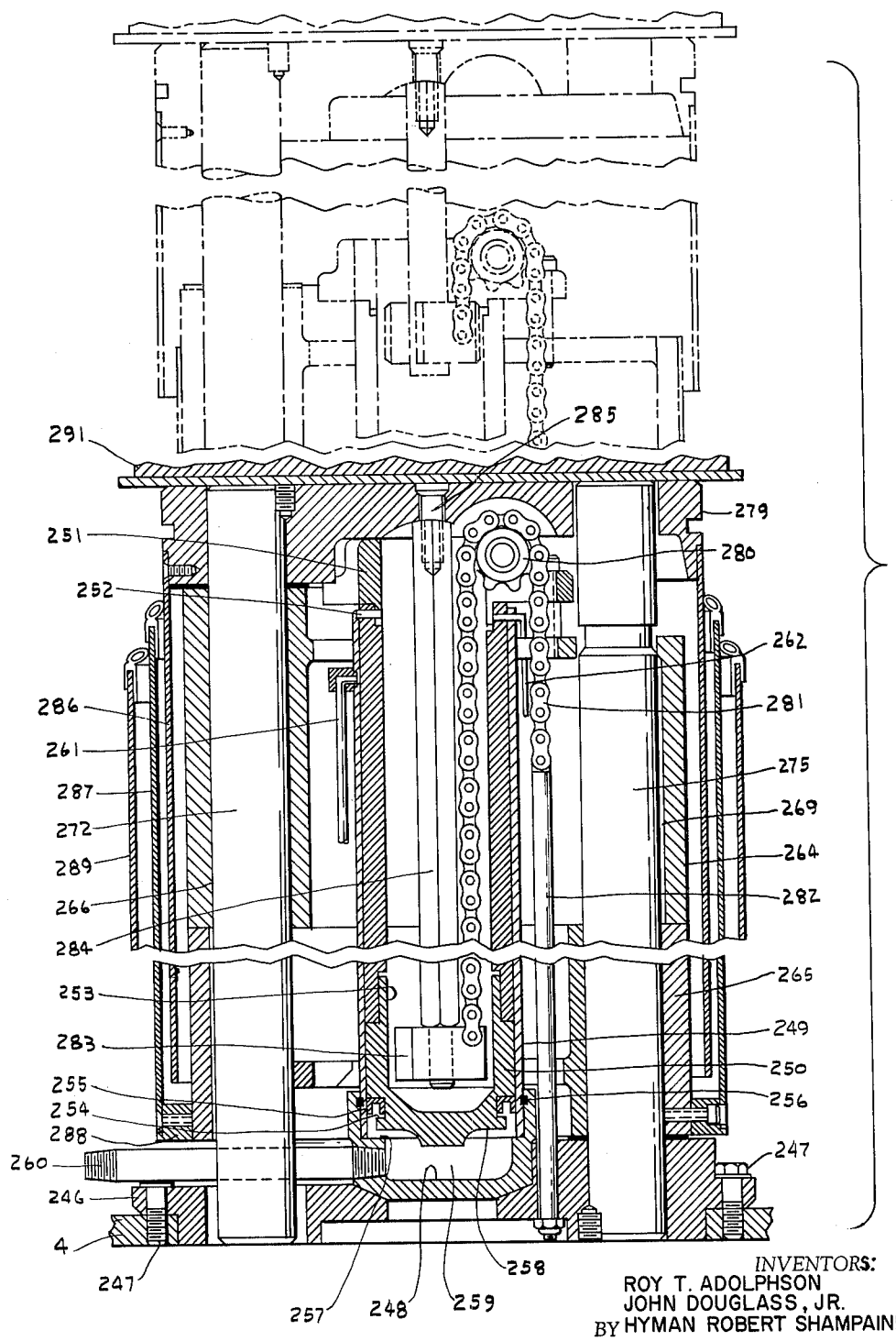
Figure 22:
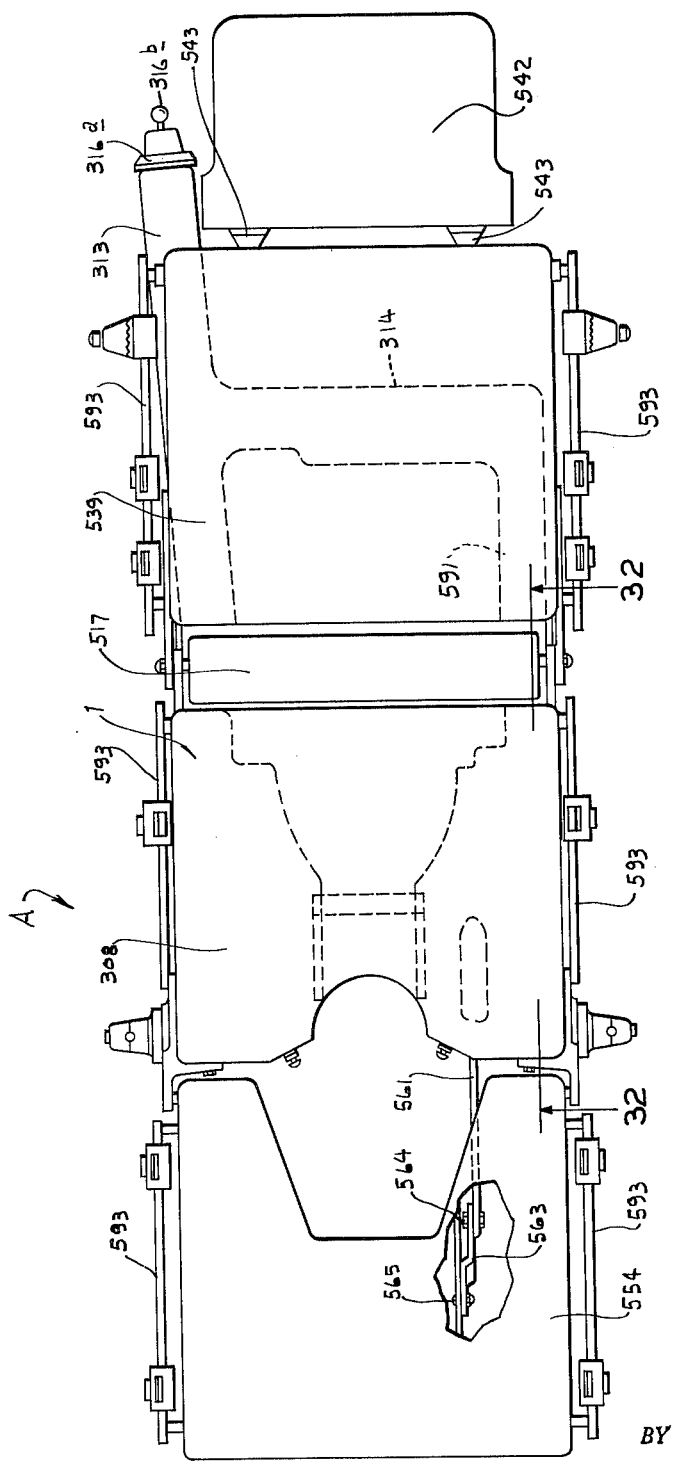
Figure 23:
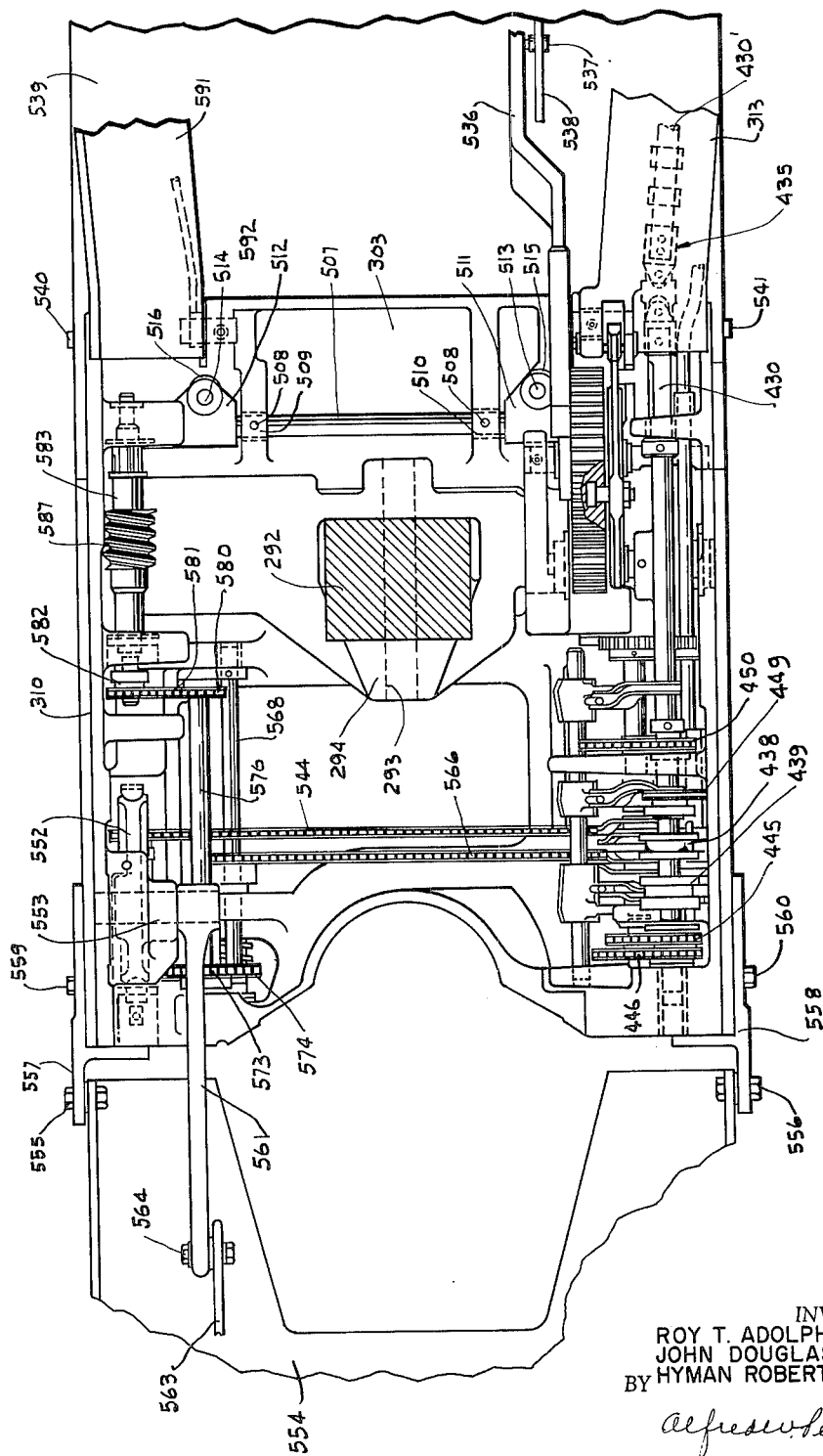
Figure 24:
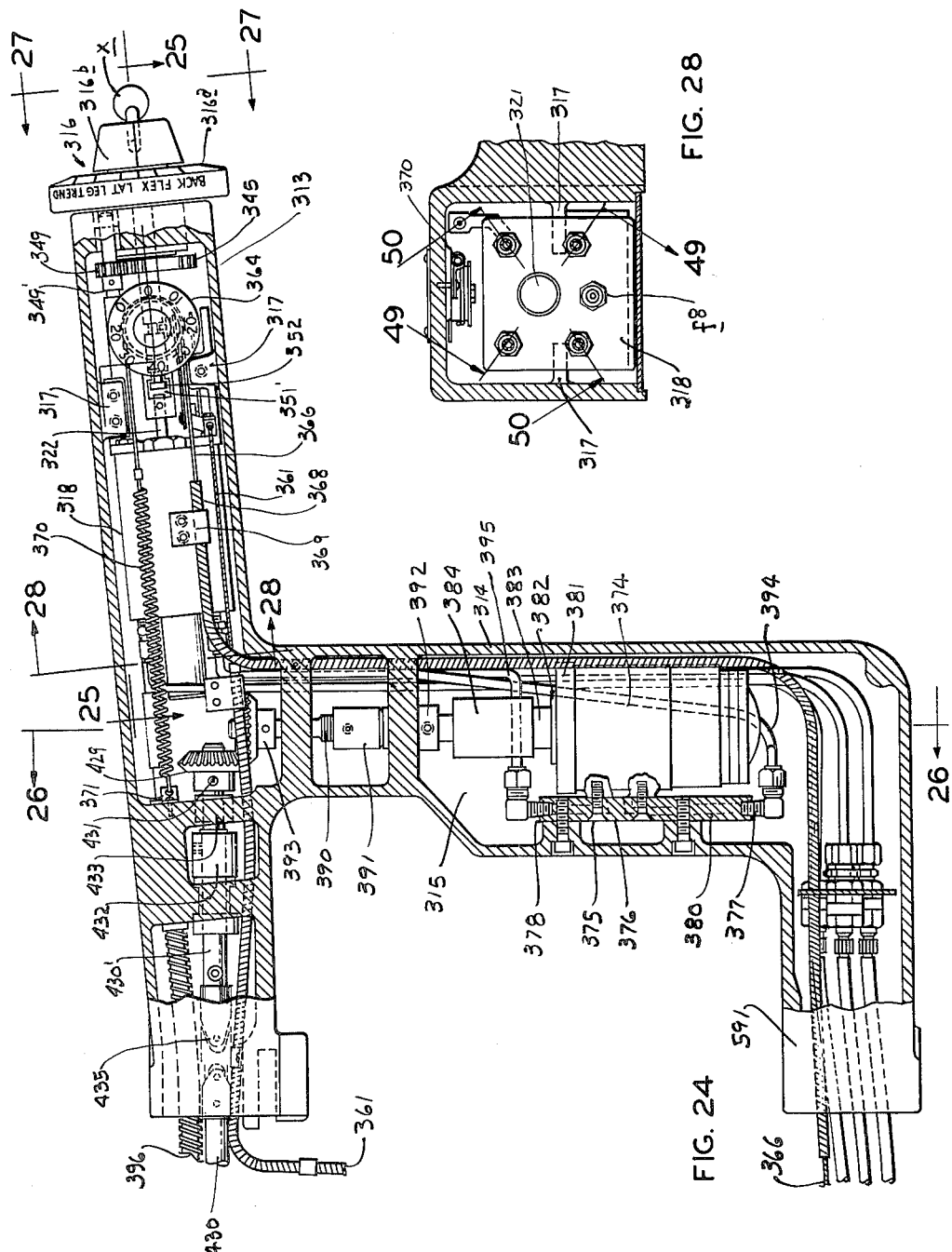
Figure 32:
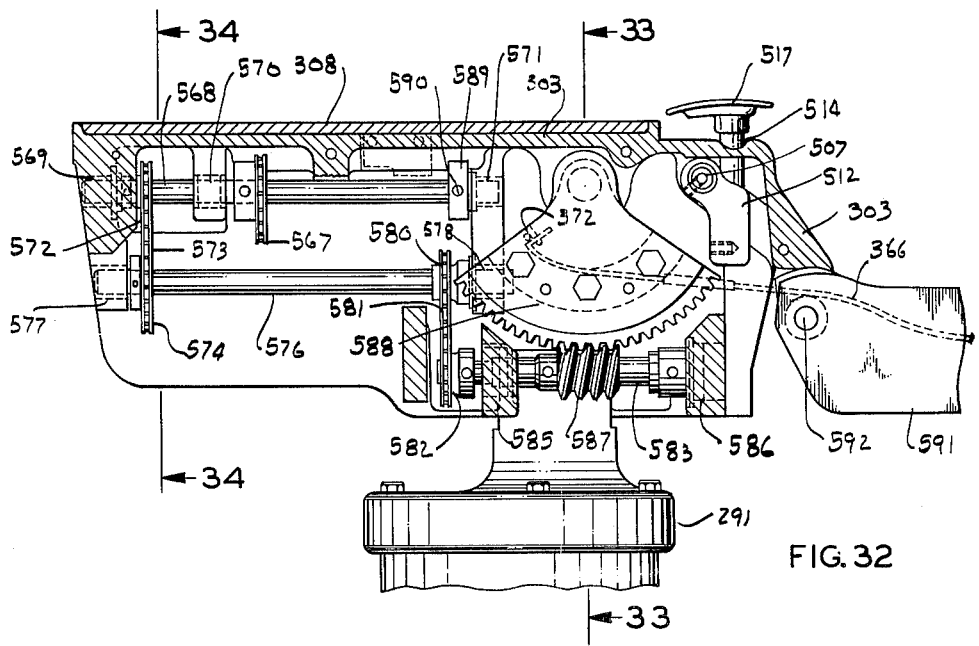
Figure 33:
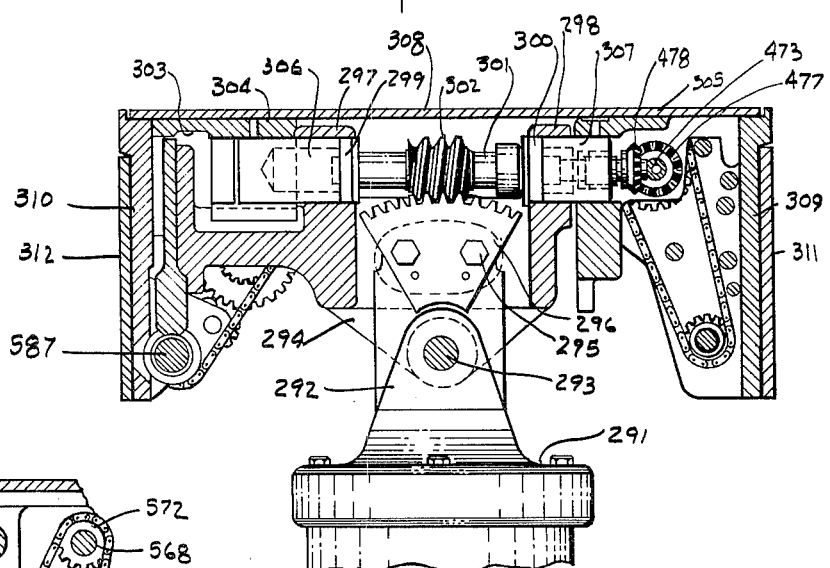
Figure 34:
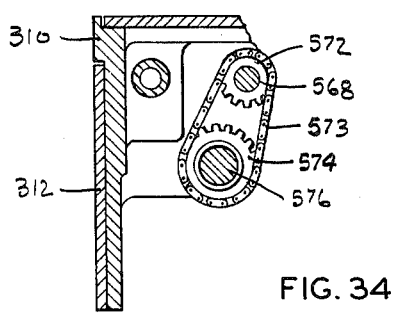
Figure 36:
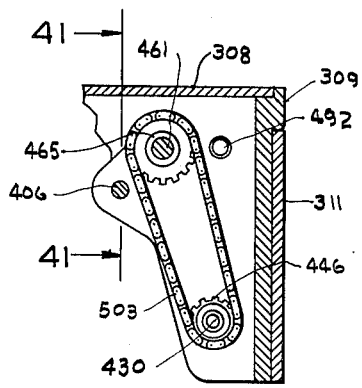
Figure 37:
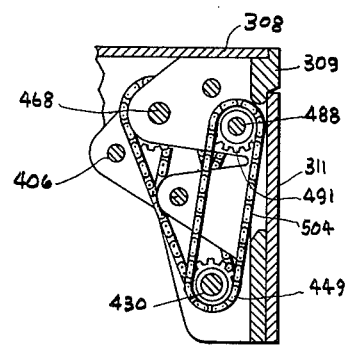
Figure 38:
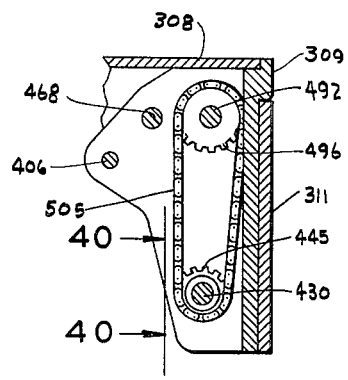
Figure 40:
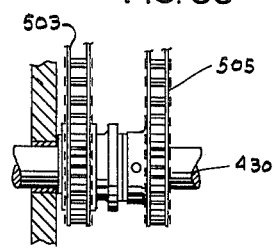
Figure 41:
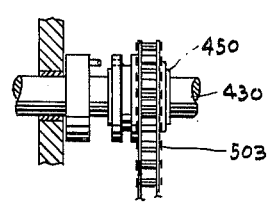
Figure 47:
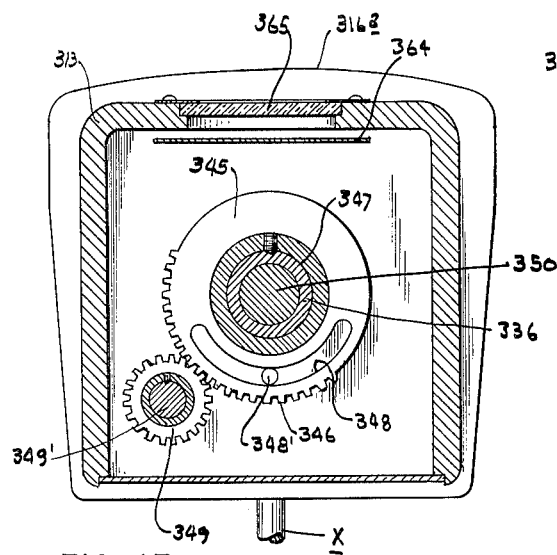
Figure 46:
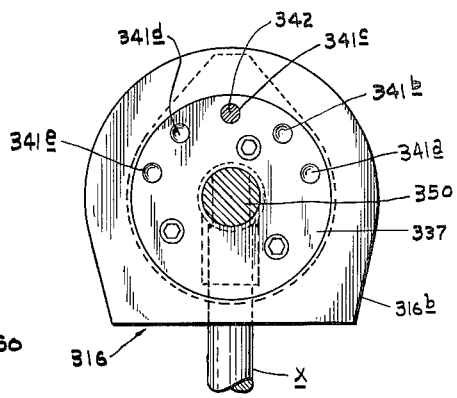
Figure 52:
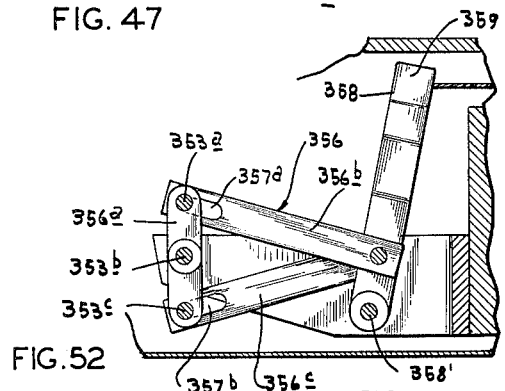
Figure 48:
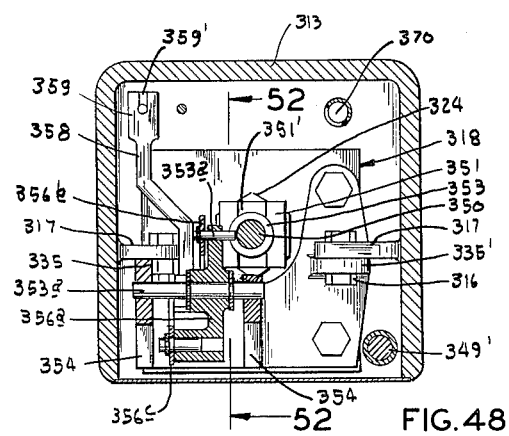
Figure 53:
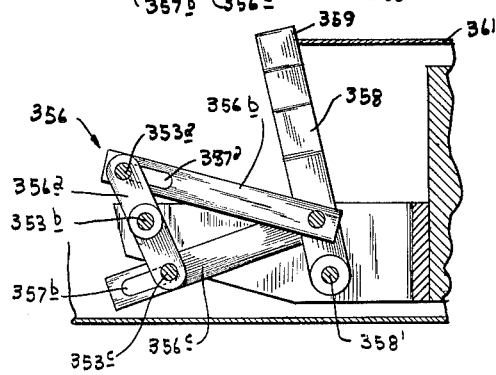
Figure 54:
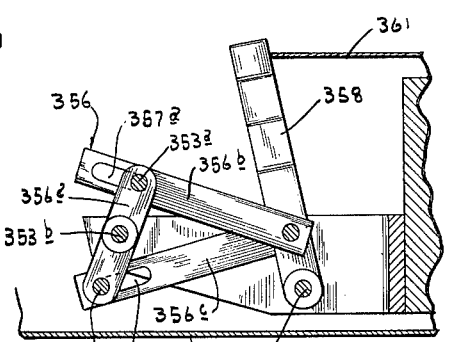
Figures 49, 50:
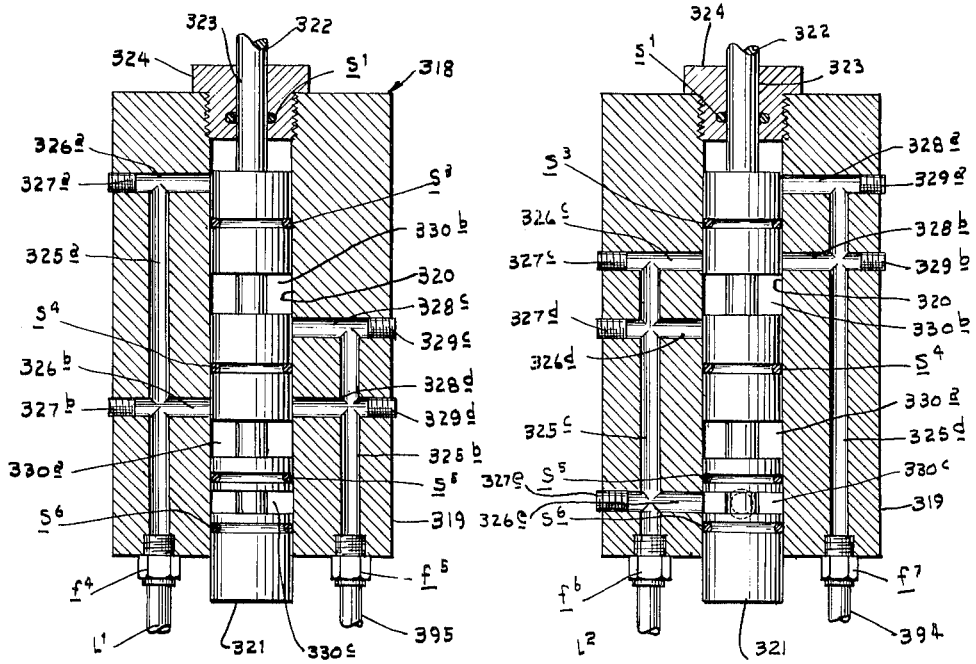
Figure 51:
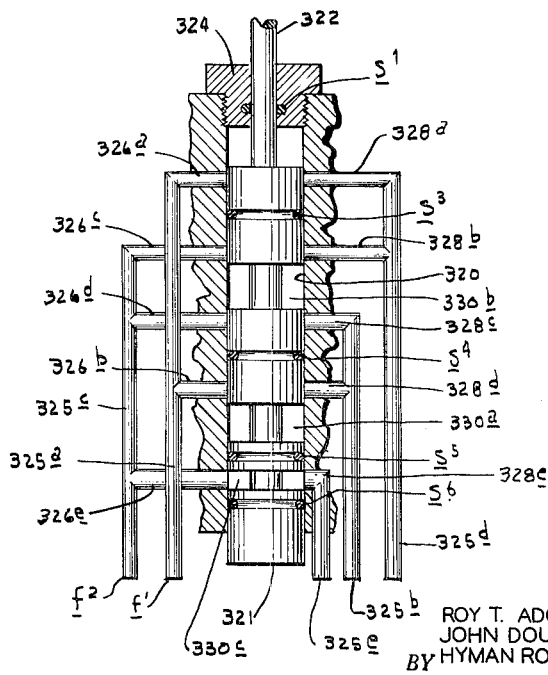
Figure 64:
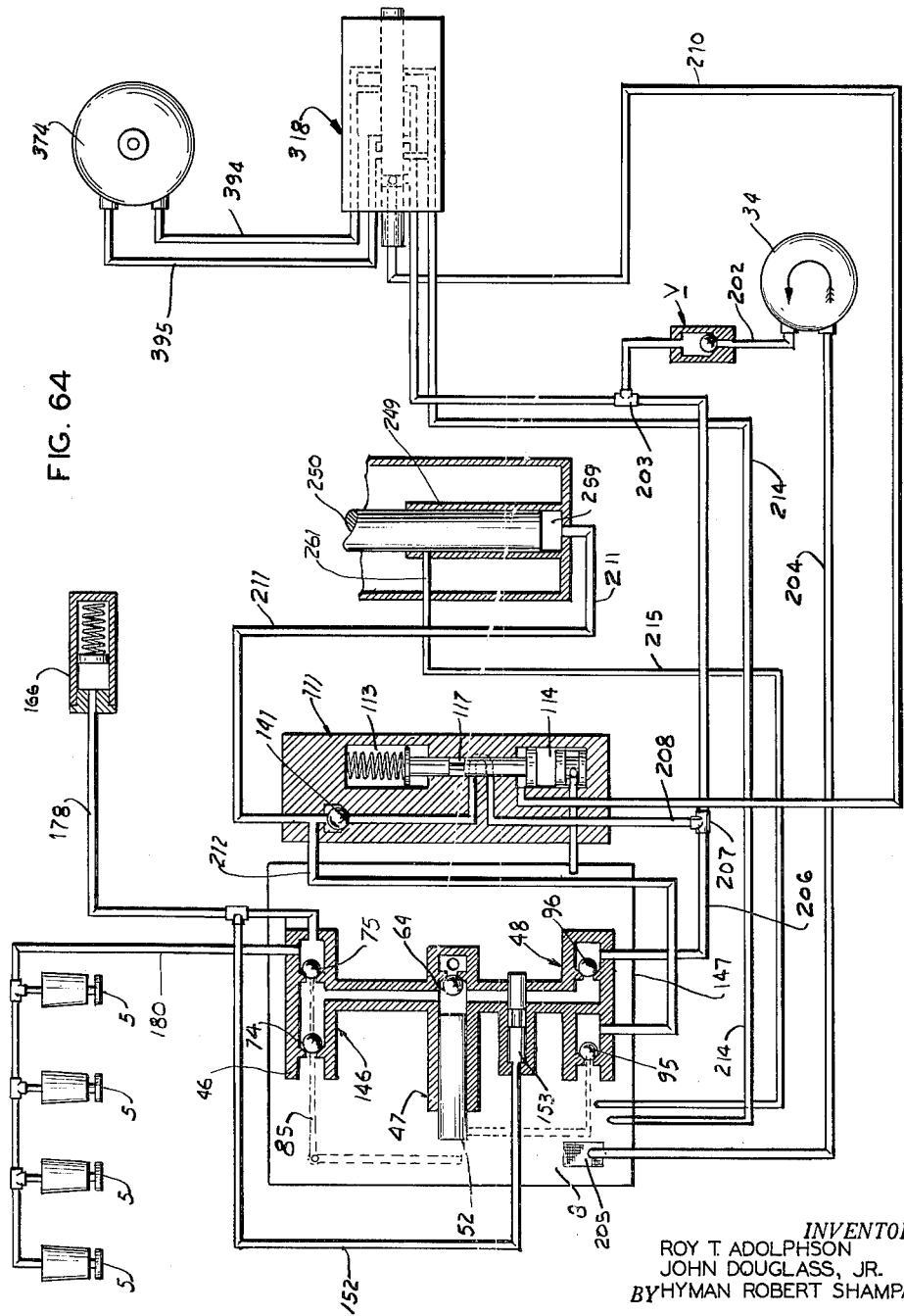

FIGS. 6, 7, and 8 are fragmentary sectional views taken along lines 6—6, 7—7, 8—8, respectively, of FIG. 4;

FIG. 9 is a fragmentary sectional view taken along line 9—9 of FIG. 6;

FIGS. 10 and 11 are diagrammatic views showing the hydraulic connections between the several components of the elevating and jack-operating mechanisms;

FIG. 12 is a fragmentary sectional view taken along line 12—12 of FIG. 5;

FIG. 13 is a fragmentary sectional view taken along line 13—13 of FIG. 1;

FIGS. 14, 15, and 16 are fragmentary sectional views taken along lines 14—14, 15—15, and 16—16, respectively, of FIG. 13;

FIG. 17 is a fragmentary sectional view taken along line 17—17 of FIG. 10;

FIG. 18 is a fragmentary sectional view taken along line 18—18 of FIG. 2;

FIG. 19 is a fragmentary sectional view taken along line 19—19 of FIG. 18;

FIG. 20 is a fragmentary sectional view taken along line 20—20 of FIG. 13;

FIG. 21 is a fragmentary sectional view taken along line 21—21 of FIG. 7, showing the pilot valve forming a part of the present invention;

FIG. 22 is a top plan view, partly broken away, of an operating table constructed in accordance with and embodying the present invention;

FIGS. 23 and 24 are fragmentary sectional views taken along lines 23—23 and 24—24, respectively, of FIG. 2;

FIGS. 25, 26, 27, and 28 are fragmentary sectional views taken along lines 25—25, 26—26, 27—27, and 28—28, respectively, of FIG. 24;

FIG. 29 is a fragmentary sectional view taken along line 29—29 of FIG. 21;

FIG. 30 is a fragmentary sectional view taken along line 30—30 of FIG. 2;

FIG. 31 is a fragmentary side elevational view, partly broken away and in section, of the right side of the seat section;

FIG. 32 is a fragmentary sectional view taken along line 32—32 of FIG. 22;

FIGS. 33 and 34 are fragmentary sectional views taken along lines 33—33 and 34—34, respectively, of FIG. 32;

FIG. 35 is a fragmentary sectional view taken along line 35—35 of FIG. 30 showing the leg section mechanism forming part of the present invention;

FIGS. 36, 37, 38, and 39 are fragmentary sectional views taken along lines 36—36, 37—37, 38—38, and 39—39, respectively, of FIG. 31;

FIG. 40 is a fragmentary sectional view taken along line 40—40 of FIG. 38;

FIG. 41 is a fragmentary sectional view taken along line 41—41 of FIG. 36;

FIGS. 42, 43, 44, and 45 are fragmentary sectional views taken along lines 42—42, 43—43, 44—44, and 45—45, respectively, of FIG. 30;

FIGS. 46, 47, and 48 are transverse sectional views taken along lines 46—46, 47—47, and 48—48, respectively, of FIG. 25;

FIGS. 49 and 50 are fragmentary sectional views taken along lines 49—49 and 50—50, respectively, of FIG. 28;

FIG. 51 is a schematic drawing illustrating the hydraulic circuitry involved in the manual controlling valve shown in section in FIGS. 49 and 50;

FIG. 52 is a fragmentary sectional view taken along line 52—52 of FIG. 48;

FIGS. 53 and 54 are diagrammatic views similar to FIG. 52 showing the linkage thereof in its two extreme positions of movement;

FIG. 55 is a side elevational view of the operating table showing the back-section elevated;

FIG. 56 is a side elevational view of the operating table in the reverse Trendelenburg position;

FIG. 57 is a side elevational view of the operating table in the Trendelenburg position;

FIG. 58 is a side elevational view of the operating table in the flex position;

FIG. 59 is a side elevational view of the operating table in the proctoscopic position;

FIG. 60 is a side elevational view of the operating table in the reflex position;

FIG. 61 is a side elevational view of the operating table in the neurosurgical position;

FIG. 62 is a side elevational view of the operating table and showing the leg-section lowered;

FIG. 63 is a front elevational view of the operating table showing the lateral tilt position, and FIG. 64 is a schematic view of the hydraulic circuitry.

Referring now in more detail and by reference characters to the drawings, which illustrate a preferred embodiment of the present invention, A designates a surgical operating table comprising a table portion 1, an elevating mechanism 2, and a base-member 3.

The base-member 3 consists of a main base casting 4, the four corners of which are provided with retractible jacks 5 and also mounted on, and depending from the base casting 4, is a plurality of casters 6 which contact the floor when the jacks 5 are in the retracted position.

Mounted at the rear of the base casting 4 (the so-called "head end," i.e. the end shown on the left side of FIG. 1 being for convenience referred to as the rear), by means of bolts 7 is an oil reservoir 8 provided with a removable cover-plate 9. As may be seen in FIGS. 4 and 5, the oil reservoir 8 is provided with a shaft 10 which is journaled in, and projects outwardly on opposite sides of, the oil reservoir 8. On one end the shaft 10 is provided with a collar 11 which terminates in a flange 12. Mounted upon, and pinned to, one of the outwardly projecting ends of the shaft 10 is a crank arm 13 which projects downwardly and rearwardly from the shaft 10 at its lower end and is integrally provided with an elongated tubular sleeve-portion 14 adapted for operatively receiving a lengthwise adjustable foot pedal assembly 15, all as best seen in FIG. 2. Also mounted on the extended end of the shaft 10 between the crank arm 13 and the proximate outwardly presented face of the reservoir 8 is a pair of spaced parallel clevis-forming arms 16, 17, which project downwardly for engagement with spaced collars 18, 19, that are rigidly mounted on a shiftable stop-rod 20, as can best be seen in FIGS. 4 and 5. The stop-rod 20 is slidably mounted in bearings 21, 22, which are, in turn, respectively mounted in bosses 23, 24, integrally formed on, and projecting outwardly from, the oil reservoir 8. Also operatively mounted on the stop-rod 20 adjacent the bosses 23, 24, are rubber bumpers 25, 25', which are inserted between each of the bosses 23, 24. One end of the rod 20 is threaded for receiving an adjustable stop-nut 26, as best seen in FIGS. 5 and 7.

Figure 3:
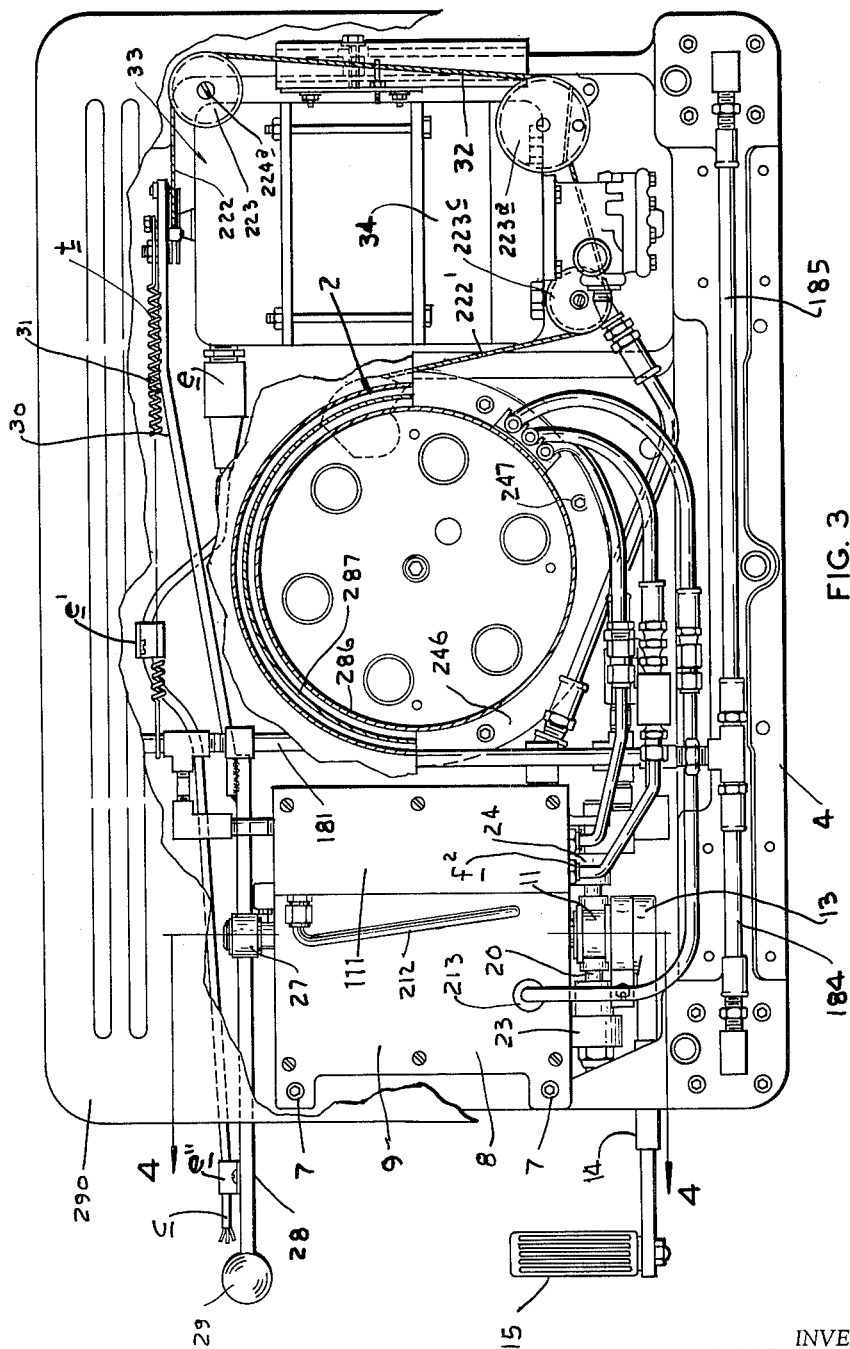
FIG. 3 is a fragmentary sectional view taken along line 3—3 of FIG. 1.

Referring now to FIG. 3, it will be seen that a collar 27 is rockably mounted on the other end of the shaft 10. A foot pedal-lever 28 extending outwardly from the base casting 4 is rigidly connected to the collar 27 and terminates in a foot pedal 29. Welded or otherwise rigidly secured on the other end of the foot pedal-lever 28 is an elongated rod 30 provided at its inner end with a retractile spring 31, as best seen in FIG. 15 and for purposes presently more fully appearing. Rigidly mounted to the base casting 4 is a bracket 32 upon which is rigidly secured an electric motor 33. The motor 33 is operatively connected to a suitable hydraulic pump 34. The construction of the motor 33 and pump 34 is conventional and well known and, therefore, is not shown or described in detail.

Referring now to FIGS. 4, 5, and 6, the shaft 10 is provided with annularly extending sealing rings 35, 36, adjacent each of the ends and is, moreover, provided with a set-collar 37 adjacent the sealing ring 36. A sleeve 38 is rigidly mounted to the shaft 10 somewhat centrally thereof by means of a pin 39. The sleeve 38 is provided with two downwardly extending spaced parallel rocker arms 40, 41, at its opposite ends. The lower ends of the rocker arms 40, 41, are pivotally secured to connecting links 42, 43, respectively, which, in turn, are operatively connected to a foot pump actuating rod 44. Referring again to FIG. 5, the oil reservoir 8 is provided internally with a valve housing 45 integrally formed with three extending bosses 46, 47, and 48. The boss 47, which is somewhat circular in nature, forms the housing of a foot pump cylinder 49, which is provided with two aligned guide slots 50, 51. The foot pump actuating rod 44 is sized to extend through the aligned guide slots 50, 51, and also projects through a foot pump piston 52 which is mounted for reciprocating movement within the foot pump cylinder 49.

Referring now to FIGS. 5 and 6, the pump actuating rod 44 extends axially through the foot pump cylinder 49 and is rigidly secured to the foot pump piston 52 by means of set screws 53, 54. The set screw 53 extends axially into the rear of the piston 52 with its rearwardly presented end located inwardly from the rear face 55 of the piston. The set screw 54 is adapted to ride in a slot 56 formed in the annular wall of the foot pump cylinder 49. At its forward end, the piston 52 is provided with a coaxial central bore 57 and is turned down on its external surface to form an annular slot 58 for retaining a flexible seal 59 that provides sealing between the inner surface of the cylinder 49 and the piston 52. The forward end of the cylinder 49 is provided with a closure plug 60 that is retained in place by a C-ring 61 snapped into an annular groove 62 at the forward end of the cylinder 49. The plug 60 is also provided with a central bore 63 and a diametral bore 64, the bore 63 being in coaxial alignment with the bore 57 and, at its interior end, opening into the central portion of the diametral bore 64. The upper end of the bore 64 is internally threaded for receiving an externally threaded plug 65 having a downwardly extending pin-like portion 66. The lower end of the bore 64 on opposite sides of the central bore 63 with respect to the plug 65 is internally machined to form a valve seat 67 for receiving a ball-check 68 biased into seated position by means of a compression spring 69 which is seated against the ball-check 68 and also encircles the pin portion 66 and abuts the plug 65. Mounted in the central bores 57 and 63 is a heavy compression spring 70 which biases the piston 52 rearwardly within the cylinder 49. The lower end of the bore 64 opens downwardly into the bottom portion of the reservoir 8 and serves as an intake opening to the cylinder 49, being covered with a close-meshed screen $m$ which strains out any foreign particles that may have been picked up by the oil in the hydraulic system.

Referring now to FIGS. 6 and 8, it will be seen that the closure plug 60 is provided with a radial aperture 71 that is in alignment with a tubular duct 72 and which, in turn, communicates with a duct 73 also formed in the valve housing 45. Fitted within the duct 73 are two check valves 74, 75, for purposes presently more fully appearing. The check valve 74 is provided with a sleeve 76 at one end of the duct 73 having a spring abutment 77 and a valve spring 78, one end of which bears against the spring abutment 77, and the other end of which biases a ball-check 79 against a valve seat 80. The valve 75 is located at the other end of the duct 73 and is provided with a valve seat 81 for receiving a ball-check 82. Extending between the ball-checks 79 and 82 is a rod 83. Threadedly mounted in one end of the duct 73 is a guide-sleeve 84 for receiving a release rod 85 which extends outwardly from the sleeve 84 and is shiftably mounted in a guide block 86 mounted on the bottom wall of the oil reservoir 8 by means of bolts 87. Rockably mounted on the bottom wall of the oil reservor 8 by a pin 88 is a release trigger 89 which is provided at one end with an adjustable abutment screw 90 which bears operatively against the rear end of the release rod 85. The other end of the release trigger 89 is provided with an abutment 91 for contacting the rear face 55 of the piston 52 mounted in the foot pump cylinder 49.

Referring again to FIG. 5, the plug 60 is provided with an aperture 92 communicating with a passageway 93, which, in turn, communicates with a duct 94 that is formed in the boss 48 of the valve housing 45. The boss 48 is, furthermore, provided with two check-valves 95, 96, similar to the pair of check-valves 74, 75, located in the boss 46. The valve 96 located at one end of the duct 94 is provided with a sleeve 97 having a spring abutment 98 for receiving one end of a valve spring 99, the other end of which biases a ball-check 100 against a valve seat 101. Another separate duct 94ᵃ is provided at its other end adjacent the check-valve 95 with a sleeve 102 which is provided with a valve seat 103 for receiving a ball-check 104. Pressure against the ball-check 104 is regulated by a stud 105 which projects into the sleeve 102 and is locked by means of a nut *n*.

Threadedly attached to one side of the electric motor 33 is an explosion-proof connector fitting *e* that receives a single-phase electrical conductor *c* for energizing the motor 33. The conductor *c* is rigidly attached to the base casting 4 by a bracket *e'* and extends exteriorly of the base casting 4 and is rigidly attached to the motor switch lever 28 by a clamp-fitting *e"*, as can best be seen in FIG. 3.

Provided for raising and lowering the elevating mechanism 2, as shown in FIGS. 7, 21, 29, is a pilot valve 111, which is mounted on the top of the oil reservoir 8 by means of bolts 112. The valve 111 is provided with a horizontally extending bore 113 that is in alignment with a bore 114 and connected by a tubular channel 115. Slidably mounted within the bore 113 and tubular channel 115 is a valve plunger 116 that is machined with an annularly extending groove 117. The valve plunger 116 is, furthermore, provided with threads on one end to receive a collar 118 that moves axially within the bore 113. The bore 113, furthermore is sealed at one end with a plug 119, which is provided with an adjustable stop-screw 120 for abutment against the end of the plunger 116. The plunger 116 is integrally provided on its lower end below the groove 117 with an axial extension 121 which terminates in a diametrally enlarged piston 122 having an outside diametral size slightly less than that of the bore 114, thereby permitting fluid to pass around the outer peripheral edge of the piston 122. Rigidly attached to the piston 122 by means of a screw 123 is a resilient valve-disk or washer 124 having an integrally formed outwardly extending annular seating-shoulder 125. The valve plunger 116 is biased rearwardly within the bore 113 by means of a spring 126 which is endwise abuttingly disposed between the collar 118 and the end face of the bore 113. The bore 114 is provided at its forward end with a closure plug 127 sealed by O rings $o^1$, $o^2$, and having a rearwardly presented seat-face 128 for contact with the seating-shoulder 125 of the washer 124. The plug 127 is, furthermore, provided with an axially extending central bore 129 and a radially extending tubular channel 130 that opens into the bore 129. The tubular channel 130 opens into a laterally extending annular channel 131 which, in turn, opens into a lengthwise tubular channel 132. Drilled vertically through the valve 111 is a tubular channel 133 that opens at one end into the tubular channel 132 and at its other end into the oil reservoir 8. Drilled lengthwise horizontally through the valve 111 are two tubular channels 134, 135. The tubular channel 134 opens into a tubular channel 136 which, in turn, opens into the bore 114. The tubular channel 134 is provided with a pipe-fitting $f^1$. The pilot valve 111 is, furthermore, provided with two laterally extending tubular channels 137, 138, that are sealed at their open ends with plugs $p^3$, $p^4$, respectively. The tubular channel 135 opens into the tubular channel 137 at one end and on the marginal surface of the pilot valve 111 at its other end and is provided with a pipe-fitting $f^2$. The tubular channel 137 opens into the lengthwise extending tubular channel 115. The laterally extending tubular channels 137, 138, are also connected by a vertical tubular channel 139. The pilot valve 111 is also provided with a lengthwise extending tubular channel 140 that opens into the tubular channel 138.

In operation, fluid is pumped through the channels 134, 136, in the bore 114, forcing the piston 122 toward the plug 127. The hydraulic fluid will flow around the annular edge of the piston 122 at a metered rate and through the bore 129 into the tubular channels 130, 131, 132, and return to the oil reservoir 8 through the tubular channel 133. Thus, the valve plunger 116 will be moved forwardly until the annular groove 117 is in alignment with the tubular channel 137. Consequently, fluid will be permitted to pass through the channels 134, 138, down through the vertical tubular channel 139 through the channel 137, around the annular groove 117, and out through the channels 137, 140. The valve plunger 116 is moved rearwardly by the action of the coil spring 126 abutting against the collar 118. The length of rearward movement can be adjusted by the stop-screw 120. The tubular channel 139 is, furthermore, provided with a check-valve 141 and at its upper end the channel 139 is internally threaded for receiving an adapter 142 for threadedly receiving a pipe-fitting 143. Also threadedly seated in the pilot valve 111 between the adapter 142 and check-valve 141 is a pipe-fitting 144.

Referring now to FIG. 12, it will be seen that the valve housing 45 is provided with two spaced upstanding vertical members 146, 147, provided with vertical bores 148, 149, communicating with the ducts 73, 94, respectively, when the ball-checks 79, 100, are in the open position. A fitting 150 is threadedly attached to the upstanding member 146 which is, in turn, connected to a T-fitting 151, the latter, in turn, being connected to a hydraulic line 152. The line 152 is connected to a fixed hollow piston 153 which is secured to a mounting arm 154 and the mounting arm 154 is secured to the threaded end 155 of a plug 156 by means of nuts 157, 158. The piston 153 is slidably mounted within the bore 159 of a restrictor valve cylinder 160. The piston 153 is also provided with a sealing ring 161 which bears against the walls of the bore 159. Integrally connected to one end of the valve cylinder 160 is a downwardly extending valve rod 162 which slidably projects through the valve housing 45, so as to extend across the passageway 93. The valve rod 162 is also provided with a diametrally reduced restrictor valve portion 163 which is adapted to open and close the passageway 93. Mounted on one end of the cylinder 160 is a spring abutment ring 164 for receiving one end of a compression spring 165 which encircles the cylinder 160 and bears at its other end against the valve housing 45, all for reasons which will presently more fully appear.

Referring now to FIG. 9, it will be seen that an accumulator 166 is secured to one end of the oil reservoir 8. The accumulator 166 comprises a fixed cylindrical housing 167, the interior of which is bored for receiving a piston 168. The piston 168 is provided at one end with an annularly extending groove 169 for receiving an annular hydraulic seal 170. The piston 168, furthermore, is provided with a central axially extending bore 171 for acceptance of a compression spring 172 which abuts at its opposite ends, respectively, against the piston 168 and a shoulder 173 formed on one end of the cylinder housing 167. A sealing cap 174 provided with an O-ring 175 is threadedly fitted into one end of the cylindrical housing 167 so as to form a fluid-tight seal against the cylinder housing 167. The cap 174 is also provided with an axially extending tubular passage 176 which is threaded for accommodating an elbow 177 which is, in turn, connected to a tube 178, the latter being connected to the T-fitting 151 by means of a nut 179.

Referring now to FIGS. 10, 11, and 12, it will be seen that a fluid line 180 is threadedly attached to the upstanding member 146 and forms a connecting passageway to the vertical bore 148. The fluid line 180 extends outwardly of the oil reservoir 8 and is threadedly attached to a laterally extending pipe 181, which is, in turn, connected to supply lines 182, 183, 184, 185, which, in turn, supply hydraulic fluid to the jacks 5.

Referring now to FIG. 17, it will be seen that each of the jacks 5 are rigidly attached to the base casting 4 by means of bolts 186. The jacks 5 each comprise a fixed cylinder 187 which slidably receives a piston 188 having a floor-contacting member 189 rigidly mounted at its lower end thereof by means of a set-screw 190. The piston 188 is provided with a diametrally enlarged head 191 with a downwardly presented surface 192 adapted for abutment with an annularly extending shoulder 193 formed within the cylinder 187. Disposed encirclingly around the piston 188 is a return spring 195. Secured to the base casting 4 and projecting into a central bore 196 of the cylinder 187 is a spindle 197 having an axial duct 198 for connection to one of the hydraulic supply lines 182, 183, 184, 185. Threaded into the diametrally enlarged head 191 is a collar 199 having a hydraulic seal 200.

When hydraulic fluid is supplied to the jacks 5, through the axial ducts 198 and into the bore 196 of the pistons 188, the pistons 188 will be urged downwardly until the operating table A is elevated off of the casters 6 and rests firmly on the jacks 5.

Referring now to FIGS. 10 and 11, it can be seen that the hydraulic pump 34 is provided with a pipe-fitting 201 for connection to a fluid pressure line 202, thereby connecting the pump 34 to a T-fitting 203. A conventional check valve $v$ is interposed between the pump 34 and the vertical upstanding member 146 for preventing unauthorized flow back into the pump 34 should the same be turned off. A fluid suction line 204 is threadedly attached to the pump 34 and to the oil reservoir 8 through a filter 205. A pressure line 206 is threadedly connected to the upstanding member 147 and is provided with a T-fitting 207. A supply line 208 suitably connects the pressure line 206 and the T-fitting 207 to the fitting $f^2$ on the pilot valve 111. A fluid line 211 is connected to the pipe-fitting 143 of the valve housing and also is connected to the base of the elevating mechanism 2 for raising and lowering the pedestal. A fluid return line 212 is connected to the other end of the pipe-fitting 144 of the pilot valve 111 and to duct 94$^a$ in boss 46 of valve housing 45 for returning the hydraulic fluid from the elevating mechanism 2. The cover-plate 9 of the oil reservoir 8 is provided with a grommet 213 for accommodating an oil reservoir line 214. The oil reservoir 8 is provided on one side with an overflow 215 and a leakage tube 216, all for reasons which will presently more fully appear.

Referring now to FIGS. 13–16, it will be seen that the electric motor 33 is provided on one side with a bracket 218 for mounting a normally open spring-biased motor starting switch 219 which has arcuate pulley-like actuating segment 220 which rocks about the axis of the switch 221. Welded or otherwise rigidly secured to the segment 220 is a rocker-plate 223 having a pin 224 which is operatively engaged in the retractile spring 31. Formed integrally with the plate 223 is an upwardly extending arm 225 which receives one hooked end of a tension spring 226 for biasing the switch 221 in the direction of the arrow as shown in FIG. 15. When the foot pedal 29 is depressed, the rod 30 will swing upwardly and rotate the segment 220 thereupon actuating the motor 33. A flexible cable 227 is trained around and attached to the segment 220 and is also trained around pulley 228 for rigid securement at its remote end to a pulley 230. The pulley 228 is conventionally mounted on the base casting 4 so as to be free for suitable rotation. A pulley 230 is similarly mounted on a shaft 231 which is journeled in the base casting 4 and is provided at its lower end with a companion pulley 232. A pulley 234 is mounted on a horizontal plate $h$ by means of a shaft 235 which is, in turn, mounted on the base casting 4. A cable 236 is secured to the pulley 232 and trained around the pulley 234. The motor switch 219 is spring biased toward closed position, but is held open by the over-riding strength of the spring 226, therefore, as the rod 30 swings up and forces the spring 226 to extend, the motor switch 219 will close. The motor 33 should be mounted on the U-shaped bracket by any conventional type of vibration-absorbing mount.

The other end of the flexible cable 236 is trained around and attached to a pulley 237 which is rigidly attached to a vertical quill-shaft 238.

Referring now to FIG. 20, it will be seen that the quill-shaft 238 forms a part of a vertical telescoping member 239$^a$ which is mounted on a bracket. A secondary tube 239$^b$ is slidably fitted upon the quill-shaft 238 and at its upper end slidably accommodates a shaft 240, the lower end of which extends loosely into the bore of the quill-shaft 238. The secondary tube 239$^b$ is rotatably mounted within a sleeve 239$^c$ which is, in turn, rigidly attached to the bracket $w$. The shaft 238, moreover, is supported at its lower end in a bearing 241 rigidly mounted within the base casting 4. The secondary tube 239$^b$ is provided with vertically spaced set collars 242$^a$, 242$^b$, which abut against the upper and lower margins of the sleeve 239$^c$ and thereby prevent vertical shifting movement of the secondary tube 239$^b$. The upper and lower transverse margins of the secondary tube 239$^c$ are similarly provided with spaced collars 242$^c$ and 242$^d$ that contain set screws for riding in a groove 243 of the shaft 238 and groove 244 of the shaft 240, respectively. The upper end of the shaft 240 is rotatably supported in conventional bearings which are mounted in the upper end of the elevating mechanism 2. A pulley 245 is rigidly secured to the upper end of shaft 240.

Referring now to FIGS. 18 and 19, it can be seen that a bottom plate 246 is rigidly mounted on the base casting 4 approximately centrally thereof by means of bolts 247. The plate 246 supports a bottom cup 248 of an upstanding hydraulic cylinder 249. A piston 250 is slidably fitted for disposition within the hydraulic cylinder 249 and the piston has a journal block 251 rigidly mounted at its upper end by means of pins 252. The piston 250 is provided with an axially extending central bore 253 and is also provided at its lower end with an annular recess 254 for receiving a hydraulic seal 255. The bottom cup 248 is also sealed with respect to the piston 250 by means of a soldered joint 256. The cup 248 is provided with an annularly extending upwardly presented shoulder 257, matched for abutment with the bottom face 258 of the piston 250, forming a fluid chamber 259. Threadedly attached to the cup member 248 is a radially extending fluid line 260 that is connected to the fluid line 211 which is, in turn, connected to the fitting 143 on the pilot valve 111. Thus, fluid can be supplied to the chamber 259 by means of the fluid lines 211 and 260. Adjacent its upper end the cylinder 249 is also provided with an overflow tube 261 that is attached to the overflow tube 215 of the oil reservoir 8. The cylinder 249 is also provided with a tube 262 that is connected to the leakage line 216 on the oil reservoir 8 so as to permit any leakage past the piston 250 to flow back into the oil reservoir 8. Secured to the journal block 251 by means of bolts 263 is a circular upper member 264 that is slidably mounted on a circular lower member 265 and is provided with six spaced parallel vertical bores 266, 267, 268, 269, 270, and 271, which are adapted to slidably receive six vertical posts 272, 273, 274, 275, 276, and 277, respectively. The vertical posts 273, 275, 277, are rigidly attached to a bottom plate 246 and the posts 272, 274, 276, are rigidly attached to an upper plate 279. Rotatably mounted on the journal block 251 are three spaced sprocket wheels 280, each of which has a roller chain 281 trained therearound. Each of the roller chains 281 has one end rigidly fastened to an anchor rod 282 which is, in turn, rigidly secured to the bottom plate 246. The other end of the roller chains 281 extend downwardly into the bore 253 of the piston 250 and are rigidly attached to a block 283. The block 283 is rigidly mounted on the lower end of a downwardly extending depending rod 284 which is secured to the upper plate 279 at its upper end by means of a screw 285.

A cover shield 286 at its upper end is rigidly mounted on the upper plate 279 and an intermediate shield 287 encircles the shield 286 and is mounted on a mounting ring 288 which is bolted to the lower member 265. An additional or lower shield 289 is secured to a rectilinear cover member 290 disposed over and around the base casting 4. Rigidly mounted on the upper plate 279 is a cap member 291 upon which is mounted the operating table A.

When fluid is pumped through the fluid line 260 into the tubular chamber 259 the piston 250 is urged upwardly in the cylinder 249 and the plate 279 and sprocket wheel 280 are carried therewith. The chain 281 is fixed to the anchor rod 282 and will, therefore, exert an upward force on the depending rod 284 which is rigidly attached to the upper plate 279 and thereby raise the upper plate 279 and attached cap 291. As the piston 250 and upper member 264 are elevated, they will move only one-half of the distance traveled by the plate 279. The posts 272, 274, 276, will move with the upper member 264 and, at the same time, the upper member 264 will ride upon the fixed vertical posts 273, 275, 277. When the lower end of the piston 250 moves upwardly past the upper end of the overflow tube 261, the piston will cease upward travel, since the oil in the cylinder 249 will merely flow through the overflow tube 261 and return to the oil reservoir 8.

When the operating table A is in a mobile position, the casters 6 are supporting the operating table and the jacks are in their withdrawn position as shown in FIGS. 1 and 2. When it is desired to immobilize the table, the foot pedal 15 is actuated, pumping fluid into the passage 72. Oil will be supplied to the vertical bore 148 of the upstanding member 146 through the passage 73. Oil will then pass through the fluid line 180, through the laterally extending pipe 181 and supply lines 182, 183, 184, 185, thereby lowering the jacks. As the piston 52 moves away from the plug 60 the suction created within the cylinder 49 will open the ball-check 68 and thereby draw oil into the lower end of the bore 64 through the screen m. The ball-check 68 will close as the piston moves toward the plug 60 and oil under pressure will then pass into the vertical bore 148 by means of the passageways 72, 73. However, oil or fluid will not pass into the vertical bore 149 since the valve rod 162 blocks the oil flow thereto. Oil will be permitted to flow through the aperture 71 and passageways 72, 73, and thereby open the ball-check 82. Oil will then be permitted to enter the vertical bore 148 and the fluid line 180 for delivery to the jacks 5, thereby lowering the jacks. However, as the oil builds up pressure within the pistons 188, the pistons will slide downwardly until the shoulder 192 of the diametrally enlarged head 191 abuts the stop-shoulder 193. This will cause the operating table A to be elevated off of the casters 6 and rest firmly on the floor. Furthermore, as the jacks 5 are being lowered, pressure will build up in the jack supply lines, and this pressure will be transmitted to the restrictor valve piston 153. The spring 165 will prevent movement of the restrictor valve piston 153 until pressure in the jack lines and in the bore 159 is sufficiently built up to lower the jacks in final resting position on the floor. When sufficient pressure has been built in the bore 159, the pressure will urge the restrictor valve 163 downwardly and allow the restrictor valve 163 to open the passageway 93. As the passageway 93 is opened, oil will flow through the pressure line 205, through the supply line 208 and into the tubular channel 135 of the pilot valve 111.

When the jacks 5 are lowered to the lowermost position by pumping the pedal 15, the oil pressure in the jack lines will be transmitted to the accumulator and urge the accumulator 166 and the piston 168 rearwardly compressing the spring 172. If the oil volume should change as a result of temperature variations or other conditions, the decrease in oil volume will cause the spring 172 to expand and move the piston 168 forwardly maintaining pressure. Therefore, the oil pressure in the system can be maintained, and, if there is an increase in oil volume, the spring 172 will be further compressed so as to compensate the excess oil without permitting destructive pressure.

In the event that the electric motor or oil pump should fail, the operating table A is provided with a foot pump 49. When this foot pump 49 is needed, if ever, the foot pedal 15 is depressed so as to rock the shaft 10 and operate the piston 52. As the pedal 15 is repeatedly operated, the spaced collars 18, 19, will bear against rubber bumpers 25, 25', respectively, each time that the pedal 15 is depressed, so that the rubber bumpers 25, 25', act as resilient cushioning to the normal manipulation of the pedal 15.

When it is desired to retract the jacks 5, the pedal 15 is lifted upwardly to its fullest extent, causing the piston 52 to contact the abutment 91 of the release trigger 88 and thereby operate the release trigger 88. This will shift the release rod 85 and open the ball-checks 79, 82, causing oil to flow out of the jacks 5 and into the oil reservoir 8. Thus, the operating table A will be lowered onto the casters 6. The jacks 5 will, therefore, be retracted so as to lower the operating table A onto the casters 6 without disturbing the position of the piston 250. It is, therefore, evident that it is possible to change the location of the operating table without altering the position of the table portion 1.

Thus, it should be obvious that this type of valve arrangement provides a safety factor in that the elevating mechanism 2 and the table portion 1 cannot be operated by foot-action without first lowering the jacks 5.

Integrally formed on the cap member 291 is an upwardly extending clevis 292 journaling a shaft 293 for rockably supporting a laterally tiltable yoke 294. Rigidly mounted to the clevis 292 by means of bolts 295 and extending upwardly therefrom is a gear segment 296. The yoke 294 is integrally formed with transversely aligned bearing supports 297, 298, that contain bearings 299, 300, respectively. A shaft 301 is integrally formed with a worm gear 302 and is mounted within the bearings 299, 300, and meshes with the gear segment 296. A seat casting 303 is integrally provided with trunnions 304, 305, that slidably accept sleeves 306, 307, which are mounted in the bearing supports 297, 298.

Rigidly mounted on the seat casting 303 is a top horizontal cover plate 308 and rigidly secured thereto is a right side plate 309 and a left side plate 310. Rigidly attached to the side plates 309, 310, are two cover plates 311, 312, respectively, all as best seen in FIG. 33. Pivotally mounted on the seat casting 303, adjacent the right side plate 309, is an outwardly extending elongated arm 313. Extending laterally across the seat casting 303 and intersecting the elongated arm 313 is a rectangular housing 314 with a removable bottom cover plate 315.

Operatively mounted on the elongated arm 313 is a manual control unit 316 comprising an indicator plate 316ª bearing the engraved indicia "Back," "Flex," "Lat," "Leg," and "Trend," which respectively designate various positional settings for the control unit 316 as indicated by the index knob 316ᵇ as will presently be more fully discussed.

Interiorly, the elongated arm 313 is provided with a bracket 317 for rigidly supporting a multiple-port valve 318, secured thereto by means of bolts b, all as best seen in FIGS. 28, 49, 50, and 51. The valve 318 comprises a cylindrical valve body 319 having an axial central bore 320, and a valve spool 321 shiftably and rotatably mounted therein. The valve spool 321 is provided at its rear end with a diametrally reduced shaft 322 which projects through a gland-nut 323 threadedly seated in the rear end of the valve body 319 and having an annular extending sealing ring 324.

As above stated, oil will flow through the pressure line 205, through the supply line 208 and into the tubular channel 135 of the pilot valve 111 and thence the valve 318. Thus, when it is desired to raise the pedestal electrically, one merely depresses the rod 30 thereby actuating the pump 34. When the valve 318 is in neutral, oil will then be permitted to pass, by way of the pilot line 210, into the channel 134 of the pilot valve 111 into the tubular channel 136 and into the bore 114. The pilot valve 111 will function, as described above, permitting oil to be pumped into the fluid line 260 for delivery into the piston 250 of the elevating mechanism 2.

Referring now to FIGS. 49–51, it will be seen that the valve body 319 is provided with five elongated axial ducts 325$^a$, 325$^b$, 325$^c$, 325$^d$, 325$^e$, which open on one laterally presented side of the housing and are provided with standard pipe-fittings $f^4$, $f^5$, $f^6$, $f^7$, $f^8$, respectively. The duct 325$^a$ is provided with two radially extending lateral ducts 326$^a$, 326$^b$, and the duct 325$^c$ is similarly provided with three lateral ducts 326$^c$, 326$^d$, and 326$^e$, all of said lateral ducts 326$^a$, 326$^b$, 326$^c$, 326$^d$, and 326$^e$, opening into the central bore 320. For convenience of manufacture, the lateral ducts 326$^a$, 326$^b$, 326$^c$, 326$^d$, are drilled radially from the exterior of the valve body 319 and the open ends then closed by threaded plugs 327$^a$, 327$^b$, 327$^c$, 327$^d$, and 327$^e$. The duct 325$^d$ is provided with two radially extending lateral ducts 328$^a$, 328$^b$, that open into the bore 320 and, similarly, the duct 325$^b$ is provided with two radially extending lateral ducts 328$^c$, 328$^d$. The lateral ducts 328$^a$, 328$^b$, 328$^c$, and 328$^d$, are also drilled radially from the exterior of the valve body and the outer ends closed by threaded plugs 329$^a$, 329$^b$, 329$^c$, and 329$^d$. Lateral ducts 326$^a$, 326$^b$, are aligned with the lateral ducts 328$^a$, 328$^d$, respectively. Similarly, the lateral ducts 326$^c$ and 326$^d$ are aligned with lateral ducts 328$^b$, 328$^c$, respectively. Similarly, lateral duct 326$^e$ is aligned with a lateral duct 328$^e$ extending into the radial duct 325$^e$. The valve spool 321 is provided with three annularly extending diametrally reduced grooves 330$^a$, 330$^b$, and 330$^c$, which have a width slightly larger than the diameter of the lateral ducts so that when the valve spool is shifted axially to a proper selected position, oil may flow through one or more axially aligned sets of lateral ducts. Annularly extending sealing rings $s^3$, $s^4$, $s^5$, $s^6$, are mounted on the valve spool 321 between each of the annular grooves 330$^a$, 330$^b$, and 330$^c$, for maintaining a fluid-tight compartmentation within the bore 320.

The pipe-fitting $f^4$ of the axial duct 325$^a$ is connected by an oil line $L^1$ to the oil reservoir line 214 which provides a return to the oil reservoir 8. The pipe-fitting $f^6$ of the axial duct 325$^c$ is connected by an oil line $L^2$ for supplying oil under pressure. As shown in FIGS. 49 to 51, the valve spool 321 is in so-called "neutral" position in which flow between the paired lateral ducts 326$^b$–328$^a$, 326$^b$–328$^d$, 326$^e$–328$^b$, 326$^d$–328$^e$ is cut off, the flow between the lateral ducts 326$^c$–328$^c$ is established. Moreover, the annular grooves 330$^a$, 330$^b$, 330$^c$, are spaced so that upon actuating the valve spool 321 in either direction, the supply of oil under pressure between lateral ducts 326$^c$–328$^e$, is cut off and flow between one or more of the paired lateral ducts is established.

Thus, it can be seen by reference to FIG. 51 that if the valve spool 321 is moved rearwardly, the annular groove 330$^b$ will be interposed between the ducts 326$^c$ and 328$^b$ permitting communication therebetween and allowing oil under pressure to be transmitted through the axial duct 325$^d$. Similarly, the annular groove 330$^a$ will be positioned between the ducts 326$^b$ and 328$^d$ permitting communication therebetween and allowing oil to return through the axial duct 325$^b$, and into the reservoir 8 through the duct 325$^a$ and reservoir line 214.

When the valve spool 321 is moved forwardly, the annular groove 330$^b$ will be positioned between the ducts 326$^d$ and 328$^e$ and the space about the diametrally reduced shaft 322 will be positioned between the ducts 326$^a$ and 328$^a$ permitting communication. Thereupon, oil will flow under pressure through ducts 325$^c$ and out through 325$^b$. Oil will return through the duct 325$^d$ to the reservoir 8 through the duct 325$^a$. It should be obvious that oil will always be supplied to the valve 318 by means of the axial duct 325$^c$ and return to the oil reservoir 8 by means of the axial duct 325$^a$, and that it is possible to optionally supply oil under pressure to either the axial duct 325$^b$ or the axial duct 325$^d$. Finally, when the valve 318 is in neutral position, the base piston 250 will function whenever the switch 221 is moved to "on" position. On the other hand, when the valve spool 321 is pushed forwardly or rearwardly, the base piston 250 must remain stationary in whatever vertical position it happens to occupy.

The indicator plate 316$^a$ is integrally formed with an inwardly extending co-axial sleeve 331 that fits within a tubular bore 332 at the end of the elongated arm 313, and is rigidly in place by means of a set screw 333. The indicator plate 316$^a$ is, moreover, provided with two axial eccentric bores 334, 335. Mounted within the bore 334 is a sleeve 336 formed integrally as a part of the index-knob 316$^b$, the latter having a downwardly opening slot 337. Mounted within the bore 335 is a coil spring 338 that abuts against a plug 339 threadedly attached to one end of the bore 335 and a plug 340 threadedly attached to the other end of the bore 335. The slot 337 is provided with five apertures 341$^a$, 341$^b$, 341$^c$, 341$^d$, 341$^e$, that are sized for acceptance of a pin 342 which is biased outwardly by the action of the coil spring 338. The pin 342 also abuts against the slot 337 of the sleeve 336.

Rigidly mounted on the sleeve 336 by any conventional means is a circular disk 345 provided along a segment of its periphery with a series of radially projecting gear teeth 346. The gear wheel also is provided with an axially extending central bore 347 in alignment with the central bore 334 of the indicator plate 316$^a$. The circular disk 345 is, moreover, provided with an arcuate slot 348 extending through an arc substantially equal to that of the gear teeth 346 on its lower portion. A forwardly extending pin 348' is mounted on the lower portion of the sleeve 331 and adapted to ride in the arcuate slot 348. By means of the pin 348' the index-knob 316$^b$ is limited in degree of rotational movement by the size of the arcuate slot 348. By having the spring-biased pin 342 sized for optional disposition in any of the five apertures 341$^a$, 341$^b$, 341$^c$, 341$^d$, and 341$^e$, in the slot 337, the index-knob 316$^b$ can be set in five fixed positions.

The gear teeth 346 of the circular disk 345 are adapted for meshing engagement with a gear 349 which is rotatably mounted on the elongated arm 313 by means of a shaft 349', all for reasons which will presently more fully appear.

Rockably mounted upon a horizontal pin 337$^a$ and projecting downwardly from the slot 337 is a handle $x$. Slidably mounted within the sleeve 336 for reciprocative movement is a shaft 350 which is pivotally mounted at its rearward end to the index-knob 316$^b$. The diametrally reduced shaft 322 is provided at its rearward end with an enlarged head 351 having a vertically extending T-shaped slot 351'. The shaft 350 is provided at its forward end with a T-shaped extension 352 that is sized for disposition within the slot 351' so that the shaft 350 may be secured to the shaft 322. The shaft 350 is, moreover, provided with a diametrally reduced portion 353 for receiving a pin 353$^a$, all as can best be seen in FIG. 25.

Referring now to FIGS. 48–54 it will be seen that two rearwardly extending plates 354, 354', are rigidly secured to brackets 355, 355', which are, in turn, bolted or otherwise rigidly secured to the elongated arm 313. A triangular linkage assembly 356 consisting of links 356$^a$, 356$^b$, and 356$^c$, are pivotally mounted to the rearwardly extending plates 354, 354', and to the shaft 350. The link 356ᵃ is pivotally attached to a pin 353ᵇ which is rigidly mounted within the plates 354, 354'. The links 356ᵇ and 356ᶜ are provided with elongated slots 357ᵃ and 357ᵇ. The slot 357ᵃ is sized for slidable accommodation of the pin 353ᵃ and the slot 357ᵇ is sized for slidable accommodation of a pin 353ᶜ, the pin 353ᶜ being pivoted on the lower end of the link 356ᵃ. The forward apex of the triangular linkage assembly 356 is pivotally secured to an upstanding shifting link 358 which is, in turn, pivotally mounted at its lower end to the rearwardly extending plates 354, 354', by means of a pin 358'. The upstanding link 358 is provided with an enlarged head 359 having an aperture 359'.

Thus, when the handle x is moved in a forward direction, the shaft 350 will move rearwardly urging the pin 353ᵃ therewith. The link 356ᵃ will pivot about the pin 353ᵃ, in the elongated slots 357ᵃ and 357ᵇ to the position shown in FIG. 53. The shifting link 358 will pivot about the pin 358' and be urged rearwardly. When the handle x is returned to a normal position, the links 356ᵃ, 356ᵇ, and 356ᶜ, will assume the position as shown in FIG. 52. When the handle x is moved in a rearward direction the shaft 350 will move in a forward direction and pivot the link 356ᵃ to the position shown in FIG. 54. The shifting link 358 will again pivot about the pin 358' to a rearward direction. It can thus be seen that the shifting link 358 will always move rearwardly when the handle x is moved to either a rearward or a forward direction.

A cable 361 is connected to the enlarged head 359 of the link 358 at the aperture 359'. The cable 361 is, moreover, trained around the annular groove 245 of the pulley 244 at its other end for operating the motor starting switch 219 on the motor 33. The cable 361 is also slidably fitted within a cable casing 361'.

Since the cable 361 is rigidly attached to the link 358, the cable 361 will be urged rearwardly as the link 358 is swung rearwardly and simultaneously the pulley 244 will rotate on the telescopic shaft assembly 234 urging the shaft 233 to rotate, thereby also rotating the pulley 232 in the base. The cable 222 which is trained around the pulley 232 will then actuate the motor starting switch 219, starting the motor 33. The handle x will always be urged to the neutral position by the action of the slot 31 that is mounted within the base casting 4. In addition, the rearward or forward movement of the handle x will also actuate the valve 318 in the manner as described above.

Rotatably mounted on a fixed shaft 362 within the elongated arm 313 is a tilt-indicator drum 363 having a graduated dial face 364 that can be observed through a transparent plate 365 on the upwardly presented face of the elongated arm 313. A cable 366 is wrapped around an annular groove 367 of the drum 363 and is slidable in a cable casing 368 which is rigidly held within the arm 313 by means of a bracket 369. One end of the cable 366 is secured to a spring 370 which is, in turn, rigidly secured to the elongated arm 313 by means of a bracket 371. As can be seen by reference to FIG. 32, the other end of the cable 366 is secured to a shoulder 372, formed on the laterally tiltable yoke 294.

Rigidly formed on the rectangular housing 314 are two brackets 373, upon which is mounted a fluid-pressure hydraulic motor 374. The motor 374 is conventional and is, therefore, not shown or described in detail. Rigidly attached to the motor by means of bolts 375 is an oil manifold 376 having ports 377, 378. Operatively connecting the manifold 376 to the motor 374 is a fluid channel 380. Secured to one end of the motor 374 is a cap 381 integrally provided with a boss 382 for mounting a motor shaft 383 extending therethrough. The motor shaft 383 is rigidly keyed to a sleeve 384 by means of a key 385. Rigidly attached to the sleeve 384 by means of a pin 386 is a drive shaft 387 which extends through a thrust bushing 388 and a bearing 388' mounted in arms 389 and 389', respectively, formed on the housing 314.

The shaft 387 is provided with a threaded portion 390 and axial movement of the shaft 387 is prevented by means of a thrust collar 391 mounted on the threaded portion 390 that bears against the thrust bushing 388. A set collar 392 also rigidly mounted on the shaft 387 bears against the arm 389 and, therefore, further retards axial shifting movement of the shaft 387. The other end of the shaft 387 is provided with a bevel gear 393.

An oil line 394 is connected to the pipe fitting f⁷ and tubular duct 325ᵈ on the valve 318 and to the port 377 on the motor 374. Similarly, an oil line 395 is connected to the pipe fitting f⁵ and tubular duct 325ᵇ on the valve 318 and to the port 378 on the motor 374. Thus, by urging the index-knob 316ᵇ forwardly, the shaft 350 will be moved rearwardly, and by actuation of the cable 361 the motor 33 will be energized thereby pumping oil through the pressure line 205 as described above. The oil will enter through the duct 325ᶜ of the valve 318 and, through operation of the valve, the oil under pressure will then exit the valve 318 through the duct 325ᵈ through the line 394 and operate the motor 374, turning the shaft 383 and powering the bevel gear 393. When the index-knob 316ᵇ is pulled rearwardly, the motor 33 is, similarly, energized pumping oil through the pressure line 205 into the valve 318. As the index-knob 316ᵇ is then moved rearwardly, and the plunger element 321 of the valve 318 has been moved forwardly, in the manner described above, oil will be sent out of the valve through the duct 325ᵇ through the line 395 and in through the port 377, thereby reversing the operation of the motor 374 and rotating the shaft 383 in the opposite direction.

Figure 42:
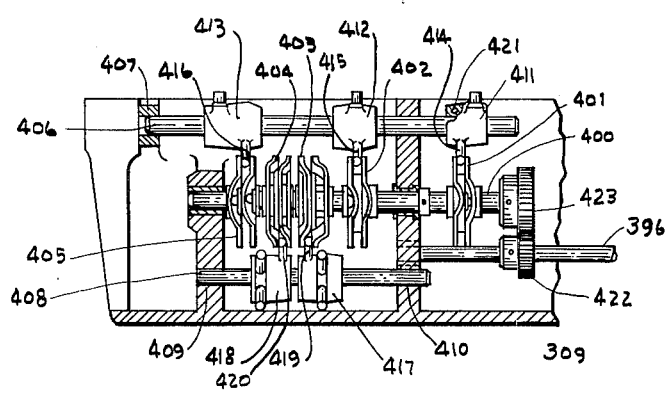
Figure 43:
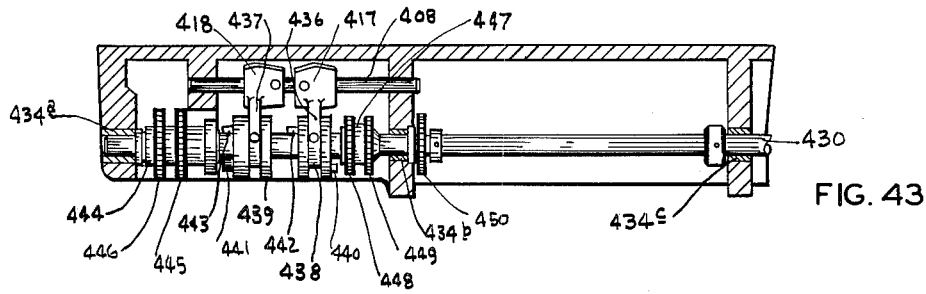

Rigidly attached to the gear 349 and rockably therewith is a flexible indexing shaft 396 that projects outwardly of the elongated arm 313, the end of which is journaled in a bearing 397, the bearing being mounted in the right side plate 309, as can be seen in FIG. 42. Thus, when the index-knob 316ᵇ is moved to any of the five positions described above, the indexing shaft 396 will rotate therewith. Also mounted in the side plate 209 by means of bearings 398, 399, is a cam shaft 400 which is provided with five cams 401, 402, 403, 404, 405, rigidly mounted thereon. Also mounted within the right side plate 309 is a shaft 406 journaled in bearings 407 and a shaft 408 journaled in bearings 409, 410, both of which are in alignment with the flexible shaft 396 and the cam shaft 400. Mounted on and projecting outwardly from the shaft 406 are three clutch actuators 411, 412, 413, each of which is provided with follower pins 414, 415, 416, respectively, which are adapted to be received by each of the cams 401, 402, 405, respectively. Clutch actuators 417, 418, are slidably mounted on the shaft 408 and are provided with outwardly extending follower pins 419, 420, which are adapted to be received by the cams 403, 404, respectively. Each of the clutch actuators 411, 412, 413, 417, and 418, should be provided with ball bushings 421 so as to provide free slidable movement on the shafts 406, 408. Rigidly mounted on the flexible shaft 396 is a pinion gear 422 that meshes with a gear 423 rigidly mounted on the cam shaft 400 so as to turn the same.

Referring again to FIG. 24, the gear 393 meshes with a mating gear 429 which is rigidly attached to a main drive shaft 430' by a pin 431. The shaft 430' is mounted in a radial bearing 432 and a thrust bearing 433. As seen by reference to FIG. 43, the main drive shaft 430 is journaled in the right side plate 309 by means of bearings 434ᵃ, 434ᵇ, 434ᶜ, and connected to shaft 430' by a universal joint 435, as shown in FIG. 23. The clutch actuators 417, 418, on the shaft 408, moreover, are provided with arms 436, 437, for slidable engagement with clutches 438, 439, each having a clutch pin 440, 441. The clutches 438, 439, are keyed to the shaft 430 by means of keys 442, 443, for axial shifting movement thereon. A quill 444 is also rotatably mounted on the main drive shaft 430 adjacent the clutch 439 for releasable engagement with the clutch pin 441. A pair of sprockets 445, 446, are mounted on the quill 444. A quill 447 is also mounted on the main drive shaft 430 which is releasably engageable with the clutch pin 440 and mounted on the quill 447 adjacent the bearing 434<sup>b</sup>, is a sprocket 448 having a hub 449 by which it is pinned to the quill 447. Mounted on the main drive shaft 430 is another sprocket 450 having a hub 451 by which it is pinned to the shaft 430.

Figure 44:
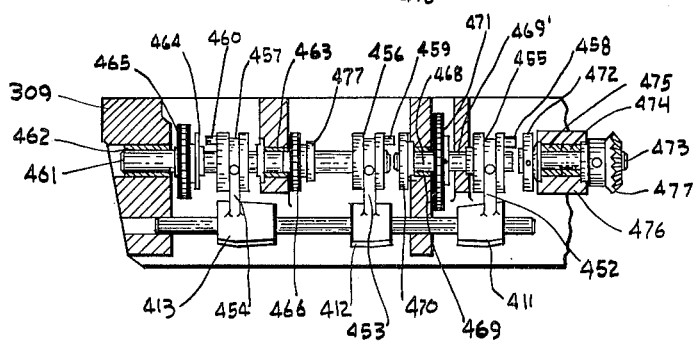

Referring now to FIG. 44, it will be seen that the clutch actuators 411, 412, 413, are provided with arms 452, 453, 454, for slidable engagement with clutches 455, 456, 457. Each of the clutches 455, 456, 457, is provided with clutch pins 458, 459, 460, respectively. The clutches 455, 456, 457, are keyed to a shaft 461 for axial shifting movement, the shaft 461 being journaled in bearings 462, 463, which are, in turn, mounted in the right side plate 309. Also mounted on the shaft 461 is a quill 464 that is releasably engageable with the clutch pin 460. Formed on the quill 464 is a sprocket 465. Pinned on the shaft 461 adjacent the bearing 463 is a sprocket 466 having a hub 467. A coaxial shaft 468 is journaled in and mounted between bearings 469, 469'. The shaft 468 is provided at one end with a pinned collar 470 which is releasably engageable with the clutch pin 459. Also mounted on the shaft 468 is a sprocket 471 and on the other end of the shaft 468 is the clutch 455, the pin 458 of which is releasably engageable with a disk 472. The disk 472 is rigidly mounted on one end of a shaft 473 in coaxial alignment with the shaft 468. The shaft 473 is journaled in aligned bearings 474, 475, which are, in turn, mounted in a boss 476 integrally formed on the seat casting 303. Rigidly secured to the end of the shaft 473 by means of a set screw is a bevel gear 477 that meshes with a similar bevel gear 478 which is mounted on the shaft 301.

Figure 39:
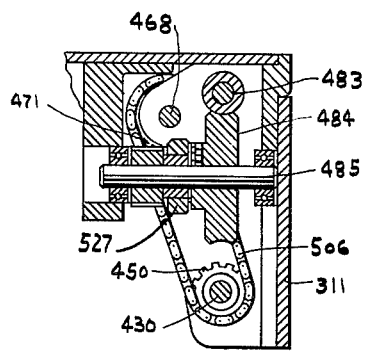
Figure 45:
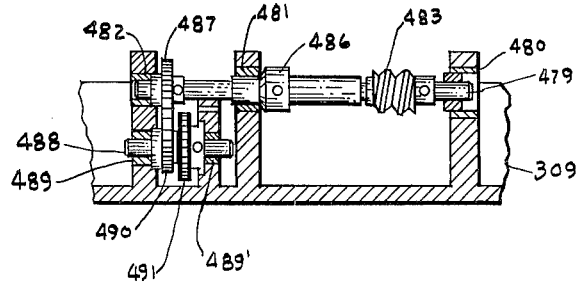

Referring now to FIG. 45, it will be seen that a shaft 479 is rotatably mounted in the right side plate 309 in upwardly and outwardly spaced parallel relation to the shaft 461 by means of aligned bearings 480, 481, 482. The shaft 479 is provided at one end with a worm gear 483 that meshes with a worm wheel 484 which is rotatably mounted on a cross-shaft 485, as seen in FIG. 39. A set collar 486 is rigidly mounted on the shaft 479 adjacent the bearing 481 and a gear 487 is also rigidly mounted on the shaft 479 adjacent the bearing 482. A stub shaft 488 is mounted in the right side plate 309 by means of bearings 489, 489', in downwardly and outwardly spaced parallel relation to the shaft 479. Mounted on the stub shaft 488 is a gear 490 that meshes with the gear 487 on the shaft 479. Also mounted on the stub shaft 488 is a sprocket 491.

Referring now to FIG. 31, it will be seen that a shaft 492 is rotatably mounted in the right side plate 309 by means of bearings 493, 494, in laterally outwardly spaced parallel relation to the shaft 461. The shaft 492 is provided with spaced sprockets 495, 496.

Referring now to FIGS. 36–41, it will be seen that a roller chain 503 is trained around sprockets 465, 446, so as to provide a drive connection between the parallel shafts 461, 430. A roller chain 504 is trained around the sprockets 491, 449, so as to provide a drive connection between shafts 430, 488. The sprockets 496 on the shaft 492 and the sprocket 445 on the shaft 430 are also in parallel alignment and are provided with a roller chain 505 thereby providing a power means to the shaft 492. Similarly, trained around the sprockets 450 and 471 of the shafts 430, 468, respectively, is a roller chain 506.

Referring now to FIGS. 23, 31, 32, it will be seen that a transversely extending support shaft 507 is rigidly mounted by means of set screws 508 in lugs 509, 510, which are integral with the seat casting 303. A pair of guide members 511, 512, are also rigidly mounted on the shaft 507. Rigidly mounted within the guides 511, 512, are vertically extending spaced parallel bars 513, 514, that project upwardly through clearance apertures 515, 516, formed in the upper surface of the seat casting 303. A transversely extending plate 517 is rigidly secured to the upper ends of each of the vertically extending bars 513, 514, and extends across the lateral distance of the operating table A.

An arm 520 is integrally formed on and depends from the guide 511 and is provided with an elongated slot 521 for slidably receiving a pin 522 mounted on and projecting laterally outwardly from a link 523. The link 523 is provided with two slots 524, 525, that are in parallel relation to and offset from each other. The slot 525 is sized to accept a sleeve 526 that is mounted on the shaft 485 adjacent the worm wheel 484. A pinion gear 527 is also rigidly mounted on the shaft 485 and meshes with a back section gear 528 that is rotatably mounted on a fixed shaft 529. The fixed shaft 529 is located in downwardly and forwardly spaced parallel relation to the shaft 485, all as best seen in FIG. 31. The shaft 529 projects through the slot 525 and is provided with a retaining ring 530. Formed in the back section gear 528 is a cam slot 531 having a straight portion 532 and a circular portion 533 that is concentric with the shaft 529. A roller 534 is mounted on the link 523 intermediate the slots 524, 525. The link 523 is provided with an elongated slot 535 for receiving an actuator pin 535' that is mounted in the arm casting 313.

Referring now to FIG. 31, it will be seen that a back section arm 536 projects outwardly from the seat casting 303 and is secured to the back section gear 528. The arm 536 is provided with a roller 537 on its outer end, the roller 537 riding in a trackway 538 that is mounted on the underside of a back section 539, as can be seen in FIG. 2. The back section 539 is rockably secured to the seat casting 303 by means of pins 540, 541, as seen in FIG. 23. An optional headrest 542 may be pivotally mounted on one end of the back section 539 by means of pins 543.

Referring now to FIGS. 23, 31, and 35, it will be seen that a roller chain 544 is trained around the sprocket 495 and extends across the seat casting 303 and is, in turn, trained around a sprocket 545, which is mounted on a worm shaft 546. Mounted within the seat casting 303 are bearings 547, 548, in which the worm shaft 546 is journaled and mounted on the shaft 546 adjacent the bearing 548 is an adjusting collar 549 that can be adjusted by means of a set screw 550. A worm gear 551 is integrally mounted on the worm shaft 546 intermediate the sprocket 545 and the set collar 549. The worm gear 551 meshes with a worm wheel segment 552 that is rigidly mounted on a cross shaft 553. The cross shaft 553 is rotatably mounted in the left side plate 310. A leg section 554 is pivotally mounted on pins 555, 556, that are, in turn, rigidly secured to crutch socket brackets 557, 558. The crutch socket brackets 557, 558, are, in turn, rigidly bolted to the seat casting 303 and side plates 309, 310, by means of bolts 559, 560. A leg section control arm 561 is rigidly secured to the cross shaft 553 by means of a pin 562 and is secured to a leg section link 563 by means of a pin 564 at its other end. The link 563, in turn, extends upwardly and is pivotally secured to the underside of the leg section 554 by means of a pin 565.

Referring now to FIGS. 23, 30, and 32, it will be seen that a roller chain 566 extends transversely across the seat casting 303 and is trained around the sprocket 467 on the right-hand side of the table and trained around a sprocket 567 which is mounted on a shaft 568. The shaft 568 extends longitudinally along the left-hand side of the table and is journaled in the left-hand side of the seat casting 303 by means of bearings 569, 570, 571. A sprocket 572 is also mounted on the shaft 568 adjacent the bearing 569. A chain 573 is trained around the sprocket 572 and is also trained around a sprocket 574 fixed to shaft 576. The shaft 576 is journaled in bearings 577, 578, which are, in turn, mounted in the seat casting 303. The shaft 576 is provided at its other end, adjacent the bearing 578, with a fixed collar 579 upon which is mounted a sprocket 580. Trained around the sprocket 580 is a roller chain 581 that is also trained around a sprocket 582 which is, in turn, mounted on a Trendelenburg worm shaft 583. The Trendelenburg worm shaft 583 is rotatably mounted in the left side plate 310 by means of bearings 585, 586, and is provided with a worm gear 587. The worm gear 587 is adapted for meshing engagement with a gear segment 588 which is bolted or otherwise rigidly secured to the laterally tiltable yoke 294. Mounted upon the shaft 568, adjacent the bearing 571, is a set collar 589 rigidly secured thereon by means of a set screw 590.

Referring again to FIG. 32, it will be seen that a left arm casting 591 is rockably mounted to the seat casting 303 by means of a pin 592.

In reference to FIGS. 1 and 2, it can be seen that the operating table A may suitably be provided with side rails 593 on its lateral margins for mounting various types of attachments ordinarily found on major operating tables.

The operation of the table portion 1 of the operating table A will now be described. As recited above, the electric motor 33 in the table base is energized by actuation of the handle x or by stepping on the foot pedal 29. The actuation of the motor 33 will, in turn, operate the pump 34. If the valve 318 is in neutral position, and the foot pedal 29 has been depressed, the base piston 250 will function. If, however, the index-knob 316ᵇ is manipulated, the hydraulic motor 374 will be set in motion and will, in turn, rotate the shaft 383. If the handle x is pulled out the motor 374 will turn in one direction and if the knob 316ᵇ is pushed in, the motor 374 will rotate in the other direction. By means of the mating bevel gears 393, 429, the power shaft 430 can then be rotated in one direction or the other. Similarly, by swinging the handle x to one side or the other so that the indexing knob 316ᵇ is at one of its various positions, the disk 345 will be rotated and this motion transmitted through the gear 349 and flexible shaft 396 to the gearing in the seat casting 303, as shown in FIGS. 30–45, inclusive. The various mechanical functions for obtaining different surgical positions is similar to that described in copending application Serial No. 750,711, filed July 24, 1958, now Patent No. 3,046,071, issued July 24, 1962, and reference can be made thereto.

In connection with the main drive shaft 430, and cam shaft 400, and in reference to FIGS. 42–45, it can be noted that the cams 401, 402, 403, 404, 405, are mounted on the cam shaft 400 in a precisely determined relationship to each other. This predetermined position will, by use of follower pins 414, 415, 416, 419, 420, shift the several clutch actuators 411, 412, 413, 417, 418, respectively, and engage or disengage the several clutches 455, 456, 457, 438, 439, in accordance with the position selection made on the indicator plate 316ᵃ. The rotating movement of the handle x will, of course, rotate the flexible shaft 396 for determining the correct programming of the various cams, clutches, and clutch actuators all of which form part of a manually operable selector means.

The operation of the back section 539 is similarly attained by programming through the flexible shaft 396 and powered through the power shaft 430. The main drive shaft or power shaft 430 is operated in the manner as previously described. During the rotation of the cam shaft 400 by the index-knob 316ᵇ, the clutch actuator 417 will be shifted by the cam 403 so that clutch 438 will drive the sprocket 449. The sprocket 449 will drive the sprocket 491 through the roller chain 504. The worm gear 483 will, in turn, be driven through the gears 487, 490, the worm gear 483, in turn, driving the worm wheel 484. The rotation of the worm wheel 484 will drive the cross shaft 485 so as to drive the pinion gear 527 and the back section gear 528 and thereby operate the back section arm 536 and shift the back section 539. The headrest 542 will, of course, swing with the back section 539 about the pins 540, 541.

As the back section 539 is progressively lowered, the arm castings 313, 591, if fixed, would ordinarily interfere with further downward travel of the back section 539. Therefore, the roller 534 rides in the circular portion 533 of the cam slot 531 during the elevation of the back section arm 536 and the roller 534 rides in the circular portion 533 for a short portion during the downward travel of the back section arm 536. As the back section 539 approaches the arms 313, 591, the roller 534 will ride in the straight portion 532 of the cam slot 531. The link 523 shifts linearly during the further consequent rotation of the gear 528 and pulls the arms 313, 536, downwardly with the back section 539. Furthermore, the pin 522 which engages the slot 521 as the link 523 rotating the guides 511, 512, thereby rocking the kidney elevator. If the kidney elevator plate 517 is thereafter extended, it will move outwardly along a path that substantially bisects the angle between the seat and the back section.

In order to operate the leg section, as illustrated in FIG. 62, the handle x is moved to the "leg" position, thereby rotating the flexible shaft 396 which, in turn, rotates the cam shaft 400 for programming. As the cam shaft 400 rotates, the cam 404 will operate the clutch actuator 418. This, in turn, will cause the clutch 439 to engage the sprocket 445. The main drive shaft 430 will power the cam shaft 400 in the manner described above and thereby rotate the sprocket 445. The sprocket 496 will also be driven through the action of the roller chain 505. The shaft 492 powers the sprocket 495 which, in turn, drives the sprocket 545 through the roller chain 544 and thereby rotates the leg section worm shaft 546 and its associated worm gear 551. The worm wheel segment 552 on the shaft 553 is then driven by the worm gear 551 and, through the leg section control arm 561 and link 563, the leg section 554 can be lowered.

In order to obtain the lateral tilt position, as shown in FIG. 63, the handle x is moved to the position marked "lateral" on the indicator plate 316ᵃ and rocked either forwardly or rearwardly to obtain either a left or a right lateral tilt. The flexible shaft 396 will rotate the cam shaft 400 and program the cams in the manner described above. The cam 401 will move the clutch actuator 411 so as to shift the clutch 455 into driving engagement with the disk 472. Continued rotation of the drive shaft 430 will drive the sprockets 450, 471, through the roller chain 506. This will, in turn, drive the shaft 473 and the bevel gear 477 which, in turn, drives the bevel gear 478 that rotates the worm shaft 301 and causes the worm gear 302 to crawl along the gear segment 296. As the gear segment 296 is turned by the worm gear 302, the lateral tilt yoke 294 will rock about the shaft 293 so as to enable the table to be laterally tilted in either direction for a left or right lateral tilt.

To obtain the flex position, the handle x is then rocked rearwardly or forwardly for either forward or reverse operation, as in the manner described above.

Similarly, the flexible shaft 396 will cause the cam shaft 400 to rotate in the manner previously described. The cam 403 will shift the actuator 417 and urge the clutch 438 into driving engagement with the sprocket 449. By this engagement, the back section 539 can be driven in the manner as previously described. The rotation of the worm gear 483 will drive the cross shaft 485 and drive the pinion gear 527 and back section gear 528 and thereby operate the back section arm 536 and shift the back section 539. At the same setting of the cam shaft 400 the cam 402 shifts the clutch actuator 412, which, in turn, urges the clutch 456 into driving engagement with the collar 470. The sprocket 466 will drive the roller chain 566, thereby driving the sprocket 567 around which it is trained. The sprocket 567 being mounted upon the shaft 568 will cause the shaft to rotate and subsequently through sprockets 572, 574, causing the shaft 576 to rotate. The roller chain 581 being trained around the sprockets 580, 582, will cause the Trendelenburg worm shaft 583 to rotate. The Trendelenburg worm gear 587 crawls along the gear segment 588 causing the table to rock about the sleeves 306, 307. As the main drive shaft 430 is rotated in one direction, the seat section 303 will go into a reverse Trendelenburg position while the back section 539 will simultaneously therewith drop downward to place the table in the flexed position, as shown in FIG. 58. The transversely extending plate member 517 will substantially bisect the angle between the seat section 303 and the back section 539. By reason of the fact that the arm castings 313, 591, drop downwardly, the back section 539 is permitted to drop downwardly to a greater degree. It can be seen that by reversing the direction of the main drive shaft 430, the seat section 303 will be moved into a Trendelenburg position while the back section 539 will be elevated so that the operating table can assume the reflex position as shown in FIG. 60.

For convenience of reference and in order to follow the various operations of the different motion producing trains of gears, sprockets and chains, it may be said that the disk 472 transmits motion to a first rotary mechanical means, the collar 470 transmits motion to a second rotary mechanical means, the sprocket 449 transmits motion to a third rotary mechanical means and the sprocket 445 transmits motion to a fourth rotary mechanical means.

In order to obtain the Trendelenburg position, as illustrated in FIG. 57, the handle $x$ will be moved to the position marked "Trendelenburg" on the indicator plate 316a and depressed to attain the Trendelenburg position. The flexible shaft 396 will be rotated in the manner described above and thereby rotate the cam shaft 400, allowing the cam 405 to move the clutch actuator 413 so as to cause the clutch 457 to engage the sprocket 465. The continued rotation of the main drive shaft 430 will drive the sprockets 446, which will, in turn, drive the sprocket 465 through the roller chain 503. Since the sprocket 467 is mounted upon the shaft 461, it will be similarly turned and transmit power to the roller chain 566 and to the sprocket 567, whereby the shaft 568 will be powered. The Trendelenburg worm shaft 583 will be powered through the chains 573, 581 and the Trendelenburg worm gear 587 will place the operating table in the Trendelenburg position. When the handle $x$ is moved to the "leg" position, the drive shaft 430 will transmit power through the sprockets 445, 496, 495, 545, and through the roller chains 504, 544, to the leg section worm gear 551. The worm gear 551 will then drive the worm wheel 552 and thereby lower the leg section 554.

As the table moves to the Trendelenburg and reverse Trendelenburg positions, as illustrated in FIGS. 47 and 48, the cable 366 will rotate the drum 363 and register the angle of tilt on the operating table. The cable 366 is connected to the lateral tilt yoke 294 by an arcuate shoulder 372 and the number of degrees of rotation of the seat section 303 will correspondingly be transmitted to the drum 363. By this manner, a true angle of the tilt of the table about the shaft 396 can be observed through the transparent plate 365.

In order to obtain a proctoscopic position, as illustrated in FIG. 59, the operating table is moved to a Trendelenburg position with the leg section lowered. The handle $x$ will be moved to the position marked "Trendelenburg" on the indicator plate 316a and raised to attain the Trendelenburg position shown in FIG. 57. The handle $x$ will then be moved to the position marked "leg" on the indicator plate 316a and pushed forward to lower the leg section.

It should be understood that changes and modifications in the form, construction, arrangement, and combination of the several parts of the operating tables may be made and substituted for those herein shown and described without departing from the nature and principle of our invention.

Having thus described our invention, what we claim and desire to secure by Letters Patent is:

1. An operating table comprising body-supporting means upon which the patient may rest for purposes of surgical procedure, a base operatively associated with said body-supporting means for holding said body-supporting means above the floor or other suitable support, said body-supporting means comprising a seat section swivelly mounted upon the upper end of the base and being adapted for lateral tilting movement and longitudinal tilting movement with respect to said base, back and leg sections swingably mounted adjacent the rear and forward margins of the seat section respectively, rotary mechanical actuating means operatively mounted within and carried by the seat section for optionally tilting the seat section laterally and longitudinally, additional rotary mechanical actuating means operatively mounted within and carried by the seat section for swinging the back and leg sections respectively in relation to the seat section, a single rotary hydraulic motor for driving said actuating means, and manually operable selector means operatively associated with said actuating means for optionally connecting the hydraulic motor to one or more of said actuating means and thereby causing the motor when energized to shift the several sections into various optional positions whereby it will cause the seat section and additional sections to move separately or in combination whenever the hydraulic motor is energized.

2. An operating table comprising body-supporting means upon which the patient may rest for purposes of surgical procedure, a base operatively associated with said body-supporting means for holding said body-supporting means above the floor or other suitable support, said body-supporting means comprising a seat section swivelly mounted upon the upper end of the base and being adapted for lateral tilting movement and longitudinal tilting movement with respect to said base, a back section swingably mounted adjacent the rear margin of the seat section, a leg section swingably mounted adjacent the forward margin of the seat section, rotary mechanical actuating means operatively mounted within and carried by the seat section for optionally tilting the seat section laterally and longitudinally, additional rotary mechanical actuating means operatively mounted within and carried by the seat section for swinging the back and leg sections respectively in relation to the seat section, a single rotary hydraulic motor for driving said actuating means, and manually operable selector means operatively associated with said actuating means for optionally connecting the hydraulic motor to one or more of said actuating means and thereby causing the motor when energized to shift the several sections into various optional positions whereby it will cause the seat section, back section and leg section to move separately or in combination whenever the hydraulic motor is energized.

3. An operating table comprising body-supporting means upon which the patient may rest for purposes of surgical procedure, a base operatively associated with said body-supporting means for holding said body-supporting means above the floor or other suitable support, said body-supporting means comprising a seat section swivelly mounted upon the upper end of the base and being adapted for lateral tilting movement and longitudinal tilting movement with respect to said base, a back section swingably mounted adjacent the rear margin of the seat section, a leg section swingably mounted adjacent the forward margin of the seat section, rotary mechanical actuating means operatively mounted within and carried by the seat section for optionally tilting the seat section laterally and longitudinally, additional rotary mechanical actuating means operatively mounted within and carried by the seat section for swinging the back and leg sections respectively in relation to the seat section, a single rotary hydraulic motor for driving said actuating means, manually operable selector means operatively associated with said actuating means for optionally connecting the hydraulic motor to one or more of said actuating means and thereby causing the motor when energized to shift the several sections into various optional positions whereby it will cause the seat section, back section and leg section to move separately or in combination whenever the hydraulic motor is energized, and manually operable means for optionally energizing the hydraulic motor.

4. An operating table comprising body-supporting means upon which the patient may rest for purposes of surgical procedure, a base operatively associated with said body-supporting means for holding said body-supporting means above the floor or other suitable support, said body-supporting means comprising a seat section swivelly mounted upon the upper end of the base and being adapted for lateral tilting movement and longitudinal tilting movement with respect to said base, a back section swingably mounted adjacent the rear margin of the seat section, a leg section swingably mounted adjacent the forward margin of the seat section, rotary mechanical actuating means operatively mounted within and carried by the seat section for optionally tilting the seat section laterally and longitudinally, additional rotary mechanical actuating means operatively mounted within and carried by the seat section for swinging the back and leg sections respectively in relation to the seat section, a single rotary hydraulic motor for driving said actuating means, means for supplying fluid under pressure to said hydraulic motor, a four-way valve operatively interposed between said last-named means and said hydraulic motor, manually operable selector means operatively associated with said actuating means for optionally connecting the hydraulic motor to one or more of said actuating means and thereby causing the motor when energized to shift the several sections into various optional positions whereby it will cause the seat section, back section and leg section to move separately or in combination whenever the hydraulic motor is energized, and manually operable means for optionally energizing the hydraulic motor.

5. An operating table comprising body-supporting means upon which the patient may rest for purposes of surgical procedure, a base operatively associated with said body-supporting means for holding said body-supporting means above the floor or other suitable support, said body-supporting means comprising a seat section swivelly mounted upon the upper end of the base and being adapted for lateral tilting movement and longitudinal tilting movement with respect to said base, a back section swingably mounted adjacent the rear margin of the seat section, a leg section swingably mounted adjacent the forward margin of the seat section, rotary mechanical actuating means operatively mounted within and carried by the seat section for optionally tilting the seat section laterally and longitudinally, additional rotary mechanical actuating means operatively mounted within and carried by the seat section for swinging the back and leg sections respectively in relation to the seat section, a single reversible rotary hydraulic motor for driving said actuating means, means for driving said hydraulic motor in a forward or reverse direction, manually operable selector means operatively associated with said actuating means for optionally connecting the hydraulic motor to one or more of said actuating means and thereby causing the motor when energized to shift the several sections into various optional positions whereby it will cause the seat section, back section and leg section to move separately or in combination whenever the hydraulic motor is energized, and manually operable means for optionally energizing the hydraulic motor.

6. An operating table comprising body-supporting means upon which the patient may rest for purposes of surgical procedure, a base operatively associated with said body-supporting means for holding said body-supporting means above the floor or other suitable support, said body-supporting means comprising a seat section swivelly mounted upon the upper end of the base and being adapted for lateral tilting movement and longitudinal tilting movement with respect to said base, a back section swingably mounted adjacent the rear margin of the seat section, a leg section swingably mounted adjacent the forward margin of the seat section, rotary mechanical actuating means operatively mounted within and carried by the seat section for optionally tilting the seat section laterally and longitudinally, additional rotary mechanical actuating means operatively mounted within and carried by the seat section for swinging the back and leg sections respectively in relation to the seat section, a single rotary hydraulic motor for driving said actuating means, manually operable selector means operatively associated with said actuating means for optionally connecting the hydraulic motor to one or more of said actuating means and thereby causing the motor when energized to shift the several sections into various optional positions whereby it will cause the seat section, back section and leg section to move separately or in combination whenever the hydraulic motor is energized, and hydraulic pump means for optionally energizing the hydraulic motor, said hydraulic pump means being operatively connected to said selector means, said selector means being adapted to energize said pump means when said selector means is actuated.

7. An operating table comprising a base, a hydraulically operated pedestal member mounted on said base and extending upwardly therefrom, a body-supporting member upon which the patient may rest for purposes of surgical procedure, said body-supporting member comprising a seat section swivelly mounted upon the upper end of the pedestal and being adapted for lateral tilting movement and longitudinal tilting movement with respect to said base, a back member swingably mounted adjacent the rear margin of the seat section, a leg member swingably mounted adjacent the forward margin of the seat section, first rotary mechanical actuating means operatively mounted within and carried by the seat section for optionally tilting the seat section laterally, second rotary mechanical actuating means operatively mounted within and carried by the seat section for optionally tilting the seat section longitudinally, third and fourth rotary mechanical actuating means also operatively mounted within and carried by the seat section for swinging the back and leg members respectively in relation to the seat section, means for providing a source of hydraulic fluid under pressure, a single rotary hydraulic motor for driving said actuating means, manually operated selector means operatively associated with said actuating means for setting said actuating means into various optional positions whereby it will cause the seat section, back member and leg member to move separately or in combination whenever the hydraulic motor is energized, and manually operable means for optionally energizing the hydraulic motor.

8. An operating table comprising a base, a hydraulically operated pedestal member mounted on said base and extending upwardly therefrom, a body-supporting member upon which the patient may rest for purposes of surgical procedure, said body-supporting member comprising a seat section swivelly mounted upon the upper end of the pedestal and being adapted for lateral tilting movement and longitudinal tilting movement with respect to said base, a back member swingably mounted adjacent the rear margin of the seat section, a leg member swingably mounted adjacent the forward margin of the seat section, first rotary mechanical actuating means operatively mounted within and carried by the seat section for optionally tilting the seat section laterally, second rotary mechanical actuating means operatively mounted within and carried by the seat section for optionally tilting the seat section longitudinally, third and fourth rotary mechanical actuating means also operatively mounted within and carried by the seat section for swinging the back and leg members respectively in relation to the seat section, means for a single rotary hydraulic motor for driving said actuating means, manually operable selector means operatively associated with said actuating means for setting said actuating means into various optional positions whereby it will cause the seat section, back member and leg member to move separately or in combination whenever the hydraulic motor is energized, and manually operable means for optionally energizing the hydraulic motor.

9. An operating table comprising a base, a hydraulically operated pedestal member mounted on said base and extending upwardly therefrom, a body-supporting member upon which the patient may rest for purposes of surgical procedure, said body-supporting member comprising a seat section swivelly mounted upon the upper end of the pedestal and being adapted for lateral tilting movement and longitudinal tilting movement with respect to said base, a back member swingably mounted adjacent the rear margin of the seat section, a leg member swingably mounted adjacent the forward margin of the seat section, first rotary mechanical actuating means operatively mounted within and carried by the seat section for optionally tilting the seat section laterally, second rotary mechanical actuating means operatively mounted within and carried by the seat section for optionally tilting the seat section longitudinally, third and fourth rotary mechanical actuating means also operatively mounted within and carried by the seat section for swinging the back and leg members respectively in relation to the seat section, means for providing a source of hydraulic fluid under pressure, a single rotary hydraulic motor for driving said actuating means, manually operable selector means operatively associated with said four actuating means for setting said several actuating means into various optional positions whereby it will cause the seat section, back member and leg member to move separately or in combination whenever the hydraulic motor is energized, and manually operable means for optionally energizing the hydraulic motor.

10. An operating table comprising a base, a hydraulically operated pedestal member mounted on said base and extending upwardly therefrom, a body-supporting member upon which the patient may rest for purposes of surgical procedure, said body-supporting member comprising a seat section swivelly mounted upon the upper end of the pedestal and being adapted for lateral tilting movement and longitudinal tilting movement with respect to said base, a back member swingably mounted adjacent the rear margin of the seat section, a leg member swingably mounted adjacent the forward margin of the seat section, first rotary mechanical actuating means operatively mounted within and carried by the seat section for optionally tilting the seat section laterally, second rotary mechanical actuating means operatively mounted within and carried by the seat section for optionally tilting the seat section longitudinally, third and fourth rotary mechanical actuating means also operatively mounted within and carried by the seat section for swinging the back and leg members respectively in relation to the seat section, means for providing a source of hydraulic fluid under pressure, a single reversible rotary hydraulic motor for driving said actuating means, a four-way valve operatively interposed between said fluid source and said hydraulic motor so that fluid may be supplied to said motor to drive in a forward or rearward direction, means for connecting said four-way valve to said manually operable selector means, movement-selector means operatively associated with said four actuating means for setting said several actuating means into various optional positions whereby it will cause the seat section, back member and leg member to move separately or in combination whenever the hydraulic motor is energized, and manually operable means for optionally energizing the hydraulic motor.

11. Driving means for use with an operating table having an articulated top consisting of a seat section, a leg section and a back section, said leg section and back section being hingedly connected respectively to the forward and rearward ends of the seat section; said driving means including a single rotary fluid motor, means for mechanically connecting said fluid motor respectively to the seat section, leg section and back section, a four-way valve operatively connected to said fluid motor, means for supplying fluid under pressure to said four-way valve, said four-way valve being adapted to supply fluid under pressure so that said fluid motor may be optionally driven in either direction, manually operable selector means for operating said four-way valve, means for connecting said selector means to said means for supplying fluid under pressure so that said last-named means can be actuated.

12. An operating table comprising a base, an articulated top portion operatively mounted on said base and including a center section, said top portion also including an additional section swingably mounted adjacent each end of the center section, first rotary mechanical driving means for laterally tilting said top portion, second rotary mechanical driving means for independently swinging each of said additional sections about a lateral axis, third rotary mechanical driving means for simultaneously longitudinally tilting the center section in one direction and swinging one of said additional sections in the other direction, fourth rotary mechanical driving means for simultaneously longitudinally tilting the center section in one direction and swinging the other of said additional sections in the other direction, so that said sections will move to various positions in which they are in dihedral-angular relation to each other, a main shaft for operating each of said driving means, a single rotary hydraulic motor operatively connected to said main shaft, means for supplying fluid under pressure, valve means operatively interposed between said hydraulic motor and said last-named means for supplying fluid under pressure, and manually operable selector means operatively connected to said driving means and said valve means, said selector means also being operatively connected to said means for supplying fluid under pressure whereby actuation of said selector means will cause fluid under pressure to be supplied to said motor through said valve means and operate said driving means.

13. An operating table comprising a base, an articulated top portion operatively mounted on said base and including a center section, said top portion also including an additional section swingably mounted adjacent each end of the center section, first rotary mechanical driving means for laterally tilting said top portion, second rotary mechanical driving means for independently swinging each of said additional sections about a lateral axis, third rotary mechanical driving means for simultaneously longitudinally tilting the center section in one direction and swinging one of said additional sections in the other direction, fourth rotary mechanical driving means for simultaneously longitudinally tilting the center section in one direction and swinging the other of said additional sections in the other direction, so that said sections will move to various positions in which they are in dihedral-angular relation to each other, a main shaft for operating each of said driving means, a single reversible rotary hydraulic motor operatively connected to said main shaft, means for supplying fluid under pressure, valve means operatively interposed between said hydraulic motor and said last named means for supplying fluid under pressure, and manually operable selector means operatively connected to said driving means and said valve means, said selector means also being operatively connected to said means for supplying fluid under pressure whereby actuation of said selector means will cause fluid under pressure to be supplied to said motor through said valve means and operate said driving means.

14. An operating table comprising a base, an articulated top portion operatively mounted on said base and including a center section, said top portion also including an additional section swingably mounted adjacent each end of the center section, first rotary mechanical driving means for laterally tilting said top portion, second rotary mechanical driving means for independently swinging each of said additional sections about a lateral axis third rotary mechanical driving means for simultaneously longitudinally tilting the center section in one direction and swinging one of said additional sections in the other direction, fourth rotary mechanical driving means for simultaneously longitudinally tilting the center section in one direction and swinging the other of said additional sections in the other direction, so that said sections will move to various positions in which they are in dihedral-angular relation to each other, a main shaft for operating each of said driving means, a single rotary hydraulic motor operatively connected to said main shaft, means for supplying fluid under pressure, valve means operatively interposed between said hydraulic motor and said last-named means for supplying fluid under pressure, said valve means being adapted to selectively apply fluid to said hydraulic motor to operate said motor in a forward or reverse direction, and manually operable selector means operatively connected to said driving means and said valve means, said selector means also being operatively connected to said means for supplying fluid under pressure whereby actuation of said selector means will cause fluid under pressure to be supplied to said motor through said valve means and operate said driving means.

15. Driving means for use with an operating table having an articulated top consisting of a seat section, a leg section and a back section, said leg section and back section being hingedly connected respectively to the forward and rearward ends of the seat section; said driving means including a single rotary fluid motor, means for connecting said fluid motor respectively to the seat section, leg section and back section, a four-way valve operatively connected to said fluid motor, means for supplying fluid under pressure to said four-way valve, said four-way valve being adapted to operate said fluid motor so that said fluid motor may be optionally driven in either direction, manually operable selector means for operating said four-way valve, and means for connecting said selector means to said valve so that said valve can be actuated.

16. Driving means for use with an operating table having an articulated top consisting of a seat section, a leg section and a back section, said leg section and back section being hingedly connected respectively to the forward and rearward ends of the seat section; said driving means including a single rotary fluid motor, means for connecting said fluid motor respectively to the seat section, leg section and back section, a four-way valve operatively connected to said fluid motor, means for supplying fluid under pressure to said four-way valve, said four-way valve being adapted to operate said fluid motor so that said fluid motor may be optionally driven in either direction, manually operable selector means for operating said four-way valve, means for connecting said selector means to said articulated top sections, and means for connecting said selector means to said valve so that said valve can be actuated.

17. An operating table comprising a base, an articulated top portion operatively mounted on said base and including a seat section, said top portion also including a leg section swingably mounted adjacent one end of the seat section, a back section swingably mounted adjacent the other end of the seat section, first rotary mechanical driving means for laterally tilting said top portion, second driving means for independently swinging the leg and back sections, third rotary mechanical driving means for simultaneously longitudinally tilting the seat section in one direction and swinging the back section in the other direction, fourth driving means for simultaneously longitudinally tilting the seat section in one direction and swinging the leg section in the other direction, a main shaft, a single rotary hydraulic motor operatively connected to said main shaft, means for supplying fluid under pressure to said motor, valve means operatively interposed between said hydraulic motor and said last-named means, and manually operable selector means operatively connected to said first, second, third and fourth driving means, said selector means also being operatively connected to said valve means whereby actuation of said selector means in one direction will cause fluid under pressure to be supplied to said motor through said valve means and actuation of the selector means in a different direction will selectively cause one or more of the first, second, third and fourth driving means to be operatively connected to the main shaft.

18. An operating table comprising a base, an articulated top portion operatively mounted on said base and including a center section, said top portion also including an additional section swingably mounted adjacent each end of the center section, first rotary mechanical driving means for laterally tilting said top portion, second driving means for independently swinging each of said additional sections longitudinally, rotary mechanical third driving means for simultaneously longitudinally tilting the center section in one direction and swinging one of said additional sections in the other direction, rotary mechanical fourth driving means for simultaneously longitudinally tilting the center section in one direction and swinging the other of said additional sections in the other direction, a main shaft, a single rotary hydraulic motor operatively connected to said main shaft, means for supplying fluid under pressure, a four-way valve operatively interposed between said hydraulic motor and said last-named means for supplying fluid under pressure, and manually operable selector means operatively connected to said first, second, third and fourth driving means and said four-way valve, said selector means also being operatively connected to said valve whereby actuation of said selector means in one direction will cause fluid under pressure to be supplied to said motor through said four-way valve and actuation of the selector means in a different direction will selectively cause one or more of the first, second, third and fourth driving means to be operatively connected to the main shaft.

19. The operating table of claim 12 wherein the means for providing a source of hydraulic fluid is power driven and is also supplied with an auxiliary manually operable pump.

References Cited by the Examiner

UNITED STATES PATENTS

| | | | |
|---|---|---|---|
| 2,520,455 | 8/1950 | Clachko | 311—7 |
| 2,582,565 | 1/1952 | Schnippel et al. | 60—52 |
| 2,647,026 | 7/1953 | Shampaine | 269—325 |
| 2,665,555 | 1/1954 | Martinsson | 60—97 |
| 2,794,694 | 6/1957 | Fullwood et al. | 311—7 |
| 2,844,942 | 7/1958 | Reynolds | 60—97 |
| 2,865,175 | 12/1958 | Gondek | 60—97 |
| 3,028,732 | 4/1962 | Shampaine et al. | 60—97 |
| 3,046,071 | 7/1962 | Shampaine et al. | 269—325 |

ROBERT C. RIORDON, *Primary Examiner.*

GEORGE L. BREHM, *Examiner.*